United States Patent
Lu et al.

(10) Patent No.: US 10,152,135 B2
(45) Date of Patent: Dec. 11, 2018

(54) USER INTERFACE RESPONSIVE TO OPERATOR POSITION AND GESTURES

(71) Applicant: Intel Corporation, Santa Clara, CA (US)

(72) Inventors: Jean Hsiang-Chun Lu, Santa Clara, CA (US); Garth Shoemaker, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 601 days.

(21) Appl. No.: 13/832,954

(22) Filed: Mar. 15, 2013

(65) Prior Publication Data
US 2014/0282271 A1 Sep. 18, 2014

(51) Int. Cl.
*G06F 3/01* (2006.01)
*G06F 3/0482* (2013.01)

(52) U.S. Cl.
CPC .............. *G06F 3/017* (2013.01); *G06F 3/011* (2013.01); *G06F 3/0482* (2013.01); *G06F 2203/04806* (2013.01)

(58) Field of Classification Search
CPC ........ G06F 3/011; G06F 3/017; G06F 3/0487; G06F 3/0482; G06F 2203/04806
USPC ......................................................... 715/863
See application file for complete search history.

(56) References Cited

U.S. PATENT DOCUMENTS

| | | | |
|---|---|---|---|
| 5,864,334 A * | 1/1999 | Sellers | 345/168 |
| 6,971,072 B1 | 11/2005 | Stein | |
| 2001/0012001 A1 * | 8/2001 | Rekimoto | G06F 3/017 345/173 |
| 2009/0079765 A1 * | 3/2009 | Hoover | 345/660 |
| 2009/0219255 A1 * | 9/2009 | Woolley et al. | 345/173 |
| 2010/0083188 A1 | 4/2010 | Pance et al. | |
| 2010/0174421 A1 | 7/2010 | Ming-Chang et al. | |
| 2010/0192101 A1 * | 7/2010 | Chmielewski et al. | 715/834 |
| 2011/0084897 A1 | 4/2011 | Manoharan et al. | |
| 2011/0197263 A1 * | 8/2011 | Stinson, III | 726/4 |
| 2011/0205186 A1 * | 8/2011 | Newton | G06F 3/011 345/175 |

(Continued)

FOREIGN PATENT DOCUMENTS

| | | |
|---|---|---|
| KR | 20070045651 A | 5/2007 |
| KR | 20090023917 A | 3/2009 |
| KR | 20100048747 A | 5/2010 |

OTHER PUBLICATIONS

Extended European Search Report received for European Patent Application No. 14769069.7. dated Sep. 28, 2016, 8 pages.

(Continued)

*Primary Examiner* — John Repsher, III

(57) ABSTRACT

Various embodiments are generally directed to the provision of multiple modes of a user interface that are automatically selected in response to the position and gestures of its operator. An apparatus includes an image sensor to capture at least one image of an operator, and a position component communicatively coupled to the image sensor to determine a proximate distance of the operator to a manually-operable control and to provide the determination of the distance to a user interface component to enable dynamic selection of one of multiple views of a visual portion of a user interface. Other embodiments are described and claimed.

16 Claims, 16 Drawing Sheets

(56) References Cited

U.S. PATENT DOCUMENTS

| | | |
|---|---|---|
| 2013/0009875 A1 | 1/2013 | Fry et al. |
| 2013/0160141 A1* | 6/2013 | Tseng et al. .................... 726/28 |
| 2013/0194238 A1* | 8/2013 | Sakai ............................ 345/175 |
| 2013/0326430 A1* | 12/2013 | Devi .................... G06F 3/0488 715/863 |
| 2014/0225820 A1* | 8/2014 | Schwesinger et al. ....... 345/156 |

OTHER PUBLICATIONS

International Search Report received for PCT Patent Application No. PCT/US2014/022256, dated Jul. 22, 2014, 5 pages.

\* cited by examiner

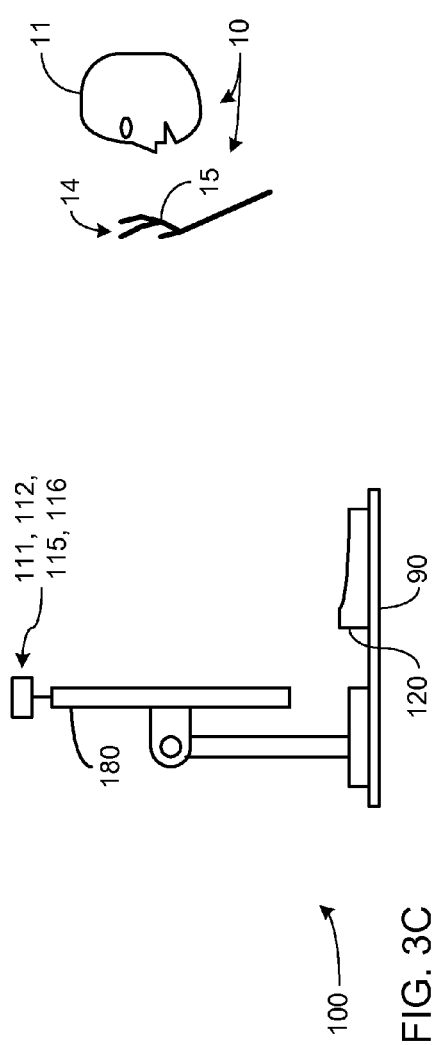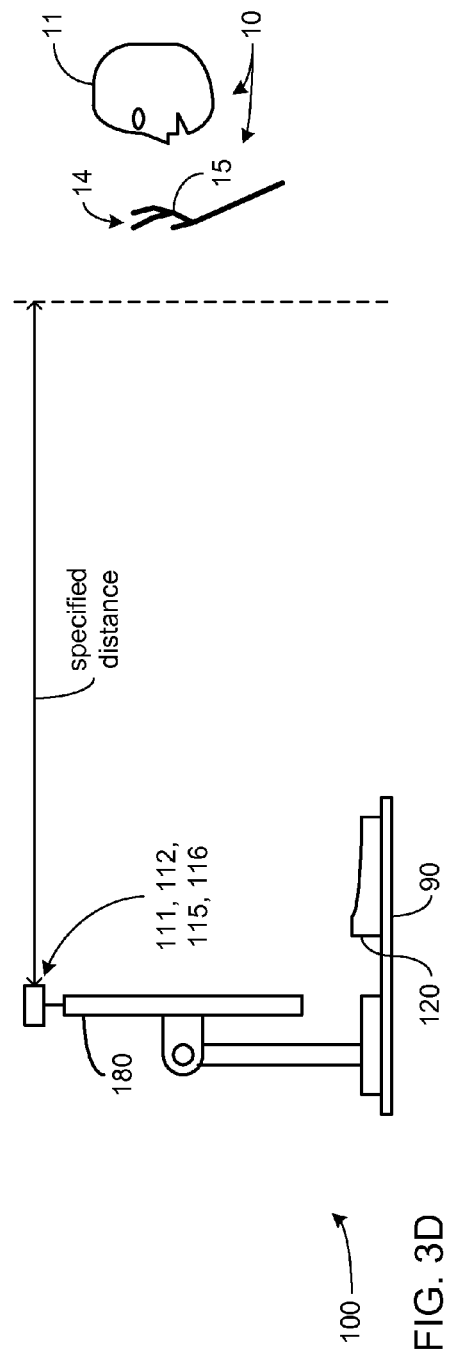
FIG. 3C
FIG. 3D

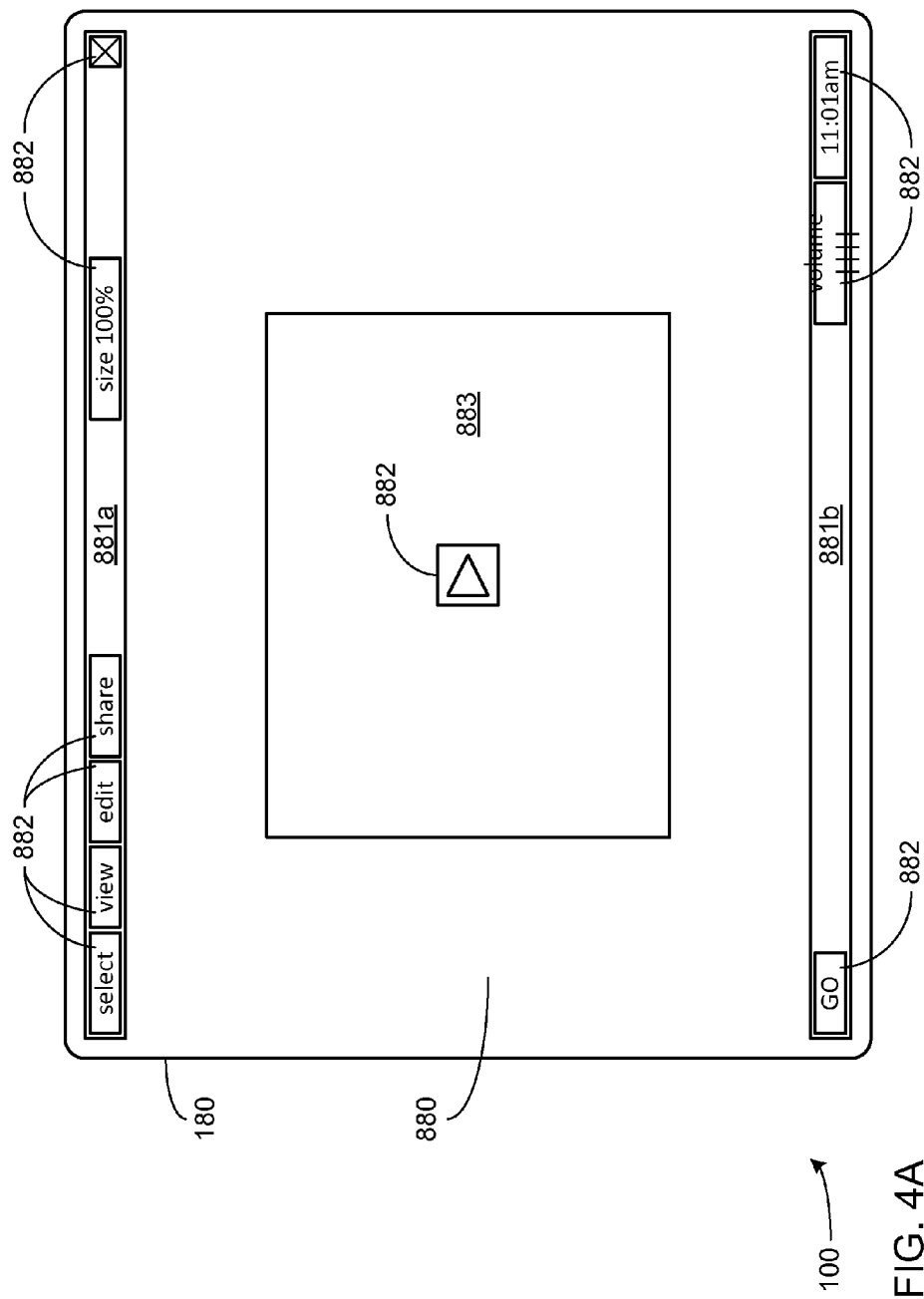

USER INTERFACE RESPONSIVE TO OPERATOR POSITION AND GESTURES

TECHNICAL FIELD

Embodiments described herein generally relate to a user interface that adopts different modes of interaction with an operator depending on the position of the operator relative to a computing device and gestures made by the operator.

BACKGROUND

Typical computing devices are configured physically and with user interfaces that support only one manner of operation, including just one set of user interface components configured in a single particular manner. This arises from a presumption that an operator of a computing device chooses a computing device that befits their desired manner of operation (e.g., a desktop to be operated at a desk, set-top box to be operated from across a room, a handheld portable to be operated while carried in a hand, etc.) and is highly unlikely to ever seek to change it.

As a result, graphical user interfaces for computing devices are invariably designed to support only one configuration of interaction. Although it is often possible for an operator of a computing device to "customize" aspects of its user interface, those customizations become part of what remains just a single manner of interaction. No opportunity is afforded in typical "setup" or "configuration" menus to create or alter configurations for multiple configurations of interaction.

The effective result is that an operator is required to adopt whatever single way of interaction that the computing device has been configured to support. More specifically, where a computing device is configured to support operation as a desktop computing device, its operator is expected to accommodate that one manner of interaction by always sitting at a desk to use it as such. No accommodation is made in the physical configuration of that computing device or in its user interface for a user who wants to interact with it in different ways at different times, e.g., sometimes while sitting at the desk and sometimes while physically away from it and that desk.

BRIEF DESCRIPTION OF THE DRAWINGS

FIGS. 3A-D illustrate aspects of different positions and gestures of an operator of an embodiment.

FIGS. 4A-F illustrate aspects of different automatically selected modes of a user interface according to an embodiment.

DETAILED DESCRIPTION

Figure 1:
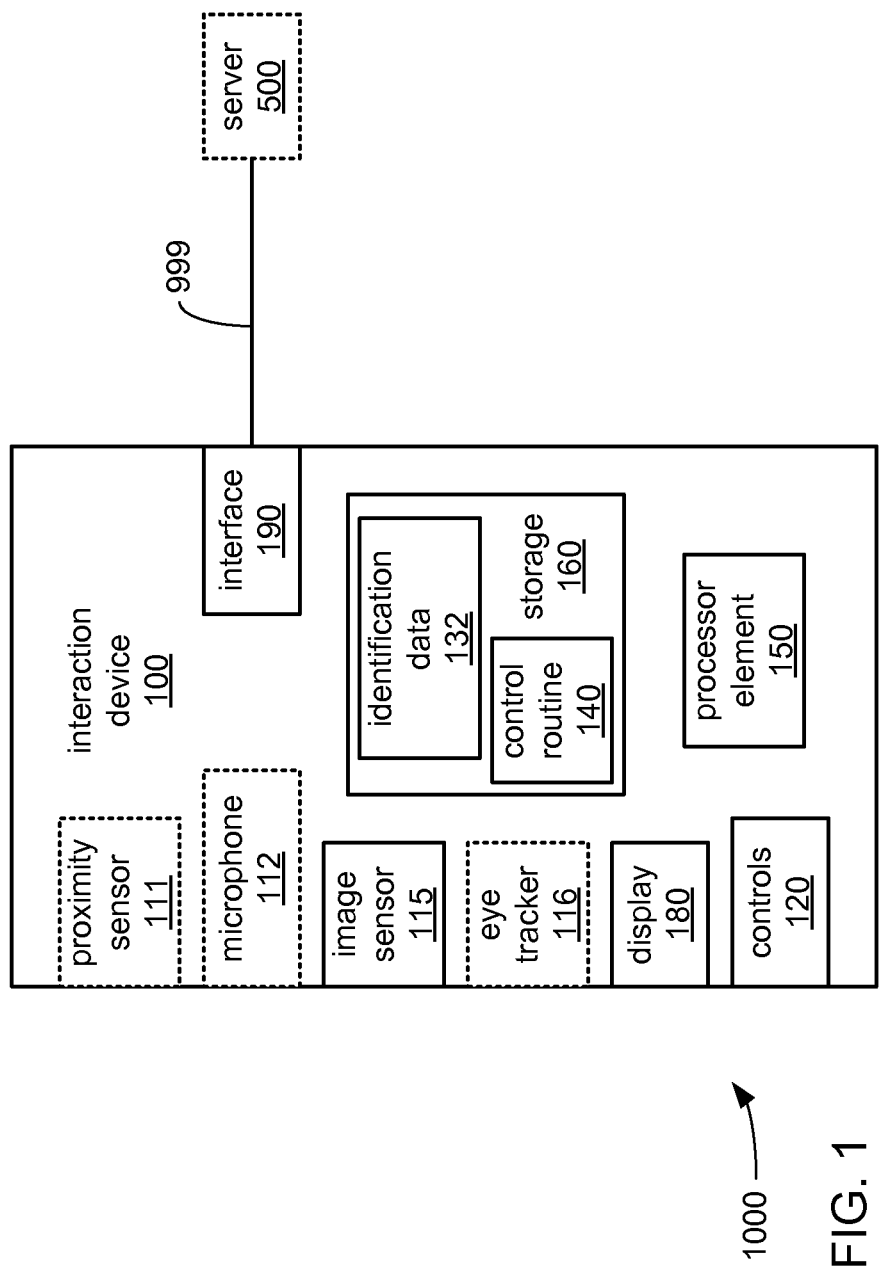
FIG. 1 illustrates aspects of an embodiment of a computing device.

Various embodiments are generally directed to the provision of multiple modes of a user interface of a computing device that are automatically selected in response to the position and gestures of its operator. More specifically, such factors as movements of an operator's hand and the position of one or more portions of the operator's body relative to a user interface component of the computing device are recurringly monitored. Such recurring monitoring continues as the operator operates the computing device to enable dynamic selection of different ones of these multiple modes as the operator possibly changes position during such operation.

One of the modes is automatically selected in response to detecting the position of the operator as being in relatively close proximity to manually-operable controls of the computing device (e.g., one or more of a mouse, a keyboard, a touchpad, a touchscreen, etc.) such that operation of those controls is possible, and in response to detecting at least one of the operator's hands as being in position to so operate those controls. Another mode is automatically selected in response to detecting the position of the operator as being in relatively close proximity to those controls, but also in response to detecting that at least one of the operator's hands as in a position to point a digit of a hand at a portion of a display of the computing device. Still another mode is automatically selected in response to detecting the position of the operator as not being in relatively close proximity to those controls.

With the automatic selection of each of these modes is an automatic selection of a view of a visual portion of a user interface in which at least selectable menu items are visually presented in different ways on the display of the computing device. One of the views of the visual portion is configured specifically to support operator interaction through use of the manually-operable controls. Another of the views is configured specifically to support operator interaction by pointing with a digit of one of the operator's hands to selectable menu items visually presented on the display while positioned relatively close to those controls. Still another of the views is configured specifically to support operator interaction by making gestures with at least one hand while positioned far enough away from the controls to preclude interaction with that user interface component. Again, as different ones of these modes are dynamically selected as the operator possibly changes position during operation of the computing device, the automatic selection of different corresponding ones of these views also occurs dynamically.

Further, with the automatic selection of each of these modes is an automatic selection of what mechanisms for verifying the identity of an operator may be employed by the computing device. The automatic selection of one of the multiple modes is based on the receipt of indications provided by one or more sensors of the position of the operator relative to the user interface component and of at least one position of at least one of the operator's hands. Such automatic selection of one of multiple modes enables an operator to interact with the computing device in different ways at different times.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an interaction system 1000 that includes an embodiment of an interaction device 100 to detect and respond to operator position and gesturing, according to an embodiment described herein. FIG. 1 also optionally depicts a server 500 maintaining an account associated with the operator, the interaction device 100 and the server 500 communicating via a network 999 therebetween to determine whether to grant the operator access to the account. Each of these computing devices 100 and 500 may be any of a variety of types of computing device, including without limitation, a desktop computer system, a data entry terminal, a laptop computer, a netbook computer, an ultrabook computer, a tablet computer, a handheld personal data assistant, a smartphone, a digital camera, a mobile device, a body-worn computing device incorporated into clothing, a computing device integrated into a vehicle, a server, a cluster of servers, a server farm, etc.

As depicted, these computing devices 100 and 500 may exchange signals concerning whether or not the identity of an operator is verified such that access may be granted to an account associated with them. However, one or more of these computing devices may exchange other data entirely unrelated to images or regions of interest. In various embodiments, the network 999 may be a single network possibly limited to extending within a single building or other relatively limited area, a combination of connected networks possibly extending a considerable distance. Stated differently, the network 999 may include the Internet, one or more private intranets, or both. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. It should also be noted that such data may alternatively be exchanged at least between these computing devices via direct coupling of a removable storage (e.g., a solid-state storage based on FLASH memory technology, an optical disc medium, etc.) at different times to each.

In various embodiments, the interaction device 100 incorporates one or more of a processor element 150, a storage 160, controls 120, a display 180, a proximity sensor 111, a microphone 112, an image sensor 115, an eye tracker 116, and an interface 190 to couple the interaction device 100 to the network 999. The storage 160 stores one or more of a control routine 140 and identification data 132. The image sensor 115 may be based on any of a variety of technologies for capturing an image of at least a face and/or a hand of an operator, including and not limited to charge-coupled device (CCD) semiconductor technology. As will be explained in detail, the image sensor 115 may be employed in determining the distance of an operator from the controls 120, verifying the identity of the operator and/or verifying that hand gestures of the operator are directed towards the interaction device 100. Alternatively or additionally, one or more of the proximity sensor 111, the microphone 112 and the eye tracker 116 may be employed to do so.

If present, the proximity sensor 111 may be based on any of a variety of technologies determining the distance of a portion of the interaction device 100 to an operator. In some embodiments, a combination of ultrasonic output and reception may be used in which ultrasonic sound waves are projected toward where the operator is expected to be to operate the interaction device 100, and the amount of time required for those sound waves to return after being reflected by the body of the operator is determined. In other embodiments, a combination of infrared light output and reception may be similarly used.

If present, the microphone 112 may be based on any of a variety of technologies for detecting the voice of an operator. The microphone 112 may be acoustically coupled to the ambient air to detect sounds therein, or may be mechanically coupled to a portion of the interaction device 100 to detect vibrations in audible frequencies conducted to it through a portion of a casing of the interaction device 100.

If present, the eye tracker 116 may be based on any of a variety of technologies for detecting the direction of the gaze of an operator's eyes. In some embodiments, a combination of infrared light output and reception may be used in which infrared light reflected from the operators eyes is analyzed to determine the direction in which the operator is looking.

In executing a sequence of instructions of the control routine 140, the processor element 150 recurringly monitors at least the image sensor 115 as it recurringly captures images of an operator of the interaction device 100. The processor element 150 does so as part of at least monitoring and interpreting hand gestures made by the operator. The processor element 150 conditions the interpreting of hand gestures on a determination of the distance of the operator from the controls 120. For example, if the operator is at a relatively short distance from the controls 120 such that the operator could operate the controls 120 with a hand (e.g., a hand of the operate is proximate to the controls 120), then the processor element 150 may limit interpretation of hand gestures to a first set of possible hand gestures, such as gestures of a hand raised to point to a portion of the display 180. While if the operator is at a relatively long distance from the controls 120 such that the operator cannot reach the controls 120 to operate the controls 120 with a hand (e.g., no portion of the body of the operator is proximate to the controls 120), then the processor element 150 may limit interpretation of hand gestures to a second set of possible hand gestures, such as numbers of digits of a hand raised in the air or other posing of a hand or digits, particular patterns of digit and/or hand movements, and/or gestures of a sign language such as ASL (American sign language). In determining the distance of the operator from the controls 120, the processor element 150 may rely largely on the image sensor 115. The processor element 150 may employ known dimensions of typical versions of the controls 120 and/or other objects in the field of view of the image sensor 115 to determine the distance to the operator with proportional comparisons. Alternatively or additionally, the processor element 150 may rely on the proximity sensor 111, receiving signals from the proximity sensor 111 indicative of a distance of a portion of the interaction device 100 (e.g., the controls 120) to the operator.

Figure 2:
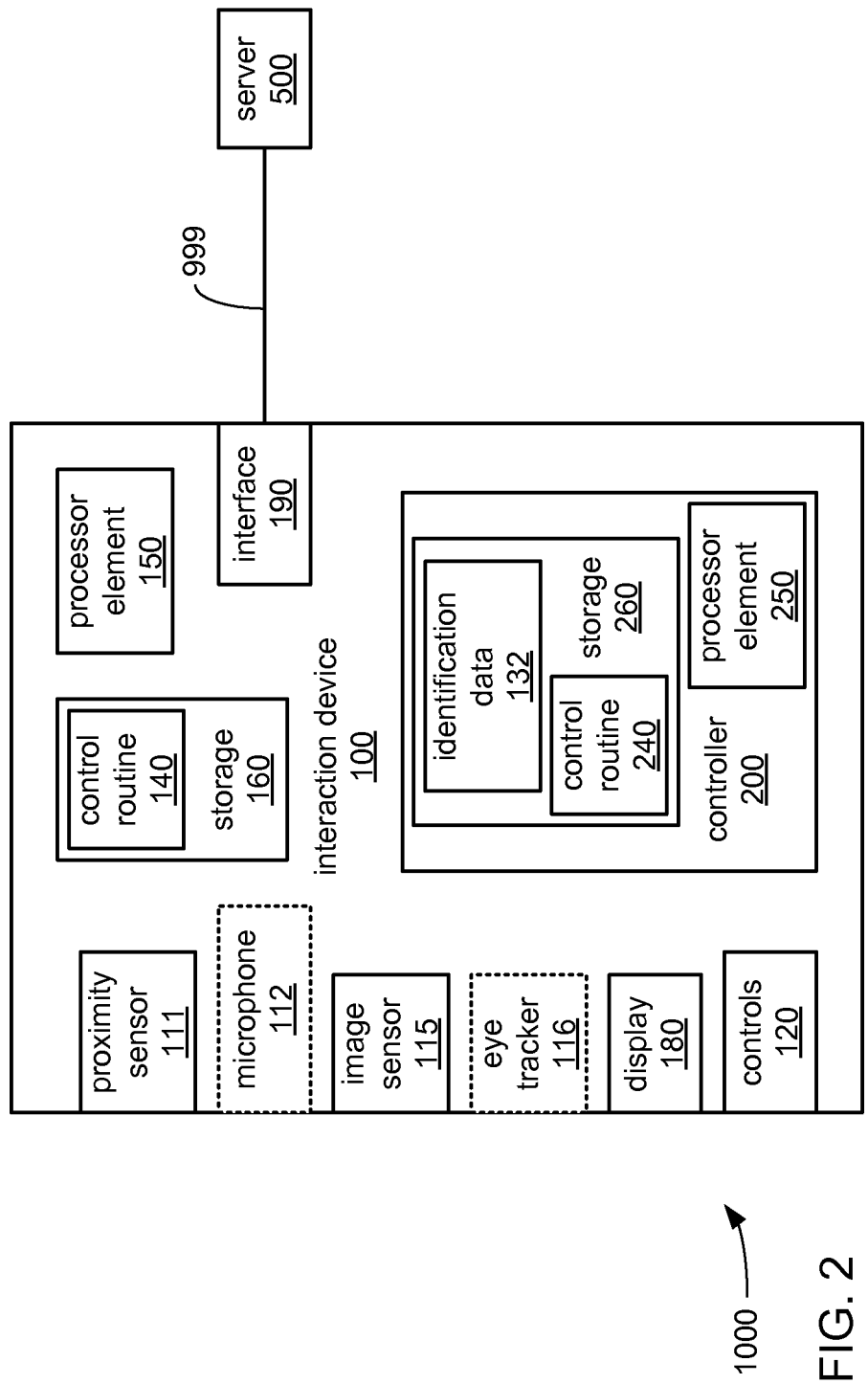
FIG. 2 illustrates aspects of an alternate embodiment of a computing device.

FIG. 2 illustrates a block diagram of the interaction system 1000 that includes an alternate embodiment of the interaction device 100. This embodiment of the interaction device 100 depicted in FIG. 4 is similar to the embodiment depicted in FIG. 1 in many ways, and thus, like reference numerals are used to refer to like elements throughout. However, unlike the interaction device 100 of FIG. 1, the interaction device 100 of FIG. 4 additionally incorporates a controller 200 that includes a processor element 250 and a storage 260. Also unlike the interaction device 100 of FIG. 1, the identification data 132 that includes indications of identifying characteristics of an authorized operator is stored within the storage 260 of the controller along with a control routine 240, instead of within the storage 160.

It is envisioned that such an incorporation of the controller 200 with a processor element 200 and storage 260 that are entirely separate from the processor 150 and the storage 160 may be deemed desirable to provide a second and entirely separate operating environment for use in operator verification. Stated differently, the processor element 250 and the storage 260 define portions of an operating environment that is substantially separate from the operating environment defined by at least the processor element 150 and the storage 160. This separate operating environment within the controller 200 enables the algorithms employed in facial, hand/gesture and/or voice recognition to be executed with a greatly reduced risk of being compromised by other less trustworthy software that may be executed by the processor element 150. The storage of the identification data 132 within the storage 260 aids in further ensuring that the identification data 132 is not compromised by being altered to enable acceptance of an unauthorized person as authorized to operate the interaction device 100.

FIGS. 3A-D depict at least some possible scenarios of how a head 11 and/or at least one digit 14 of a hand 15 of an operator 10 may be positioned relative to a portion of the interaction device 100, such as the controls 120 and/or the display 180. FIGS. 4A-F depict possible views of a visual portion 880 of a user interface that may be automatically selected and visually presented on the display 180 in response to one or more of the scenarios of FIGS. 2A-D.

As depicted in all of FIGS. 3A-D, the display 180 and the controls 120 are physically distinct portions of the interaction device 100, and are positioned atop a flat portion 90 of a piece of furniture. Physically coupled to a portion of the display 180 are one or more of the proximity sensor 111, the microphone 112, the image sensor 115 and the eye tracker 116. It should be noted that this depiction of this physical configuration of these components of the interaction device 100 presents but one possible example of a physical configuration. In other configurations, the controls 120 and the display 180 may integrated into a common casing in any of a variety of ways. Also, although the proximity sensor 111, the microphone 112, the image sensor 115 and the eye tracker 116 are depicted as encased in a distinct casing physically coupled to a portion of a casing of the display 180, that distinct casing may alternately be separately physically supported atop the flat portion 90 of the piece of furniture or in a variety of other ways. Also, entirely different physical configurations are possible in which one or more of these components 111, 112, 115 and 116 may be incorporated into the same casing as the display 180 and/or the controls 120. Stated differently, as long as each of these components 111, 112, 115 and 116 are provided with a sufficiently clear line of sight to at least one hand 15 and/or the head 11 of the operator 10 to perform their respective functions, the exact manner in which they are physically positioned or supported in the environment of the interaction device 100 is not important.

As depicted in all of FIGS. 4A-F, the visual portion 880 of the user interface is visually presented on the display 180 that includes multiple selectable items 882. As will be familiar to those skilled in the art, the selectable items 882 provide a way for an operator of the interaction device 100 to graphically initiate various functions associated with each of the selectable items 882 by operation of the controls 120 and/or another mechanism to cause one of the selectable items 882 to be selected. Some of the selectable items 882 may be associated with functions of an operating system or other support software made up of instructions executable by the processor element 150. Others of the selectable items 882 may be associated with functions of applications level software or other software made up of instructions executable by the processor element 150, and reliant upon an operating system to provide underlying support for various base level functions. As depicted, some of the selectable items 882 occupy portions of one or the other of a pair of menus 881a and 881b, either or both of which may be associated with an operating system or applications level software. As also depicted, a visual portion 883 of an application level viewing software includes a selectable item 882 associated with the function of playing a piece of motion video if selected. It should be noted that what is depicted in each of FIGS. 4A-F are but examples of possible visual presentation of different views of a visual portion 880 of a user interface that are automatically selected in response to the position and hand gestures of an operator, and should not be taken as depicting the only way in which menus and selectable items may be laid out in the viewing area of a display.

Figure 3A:
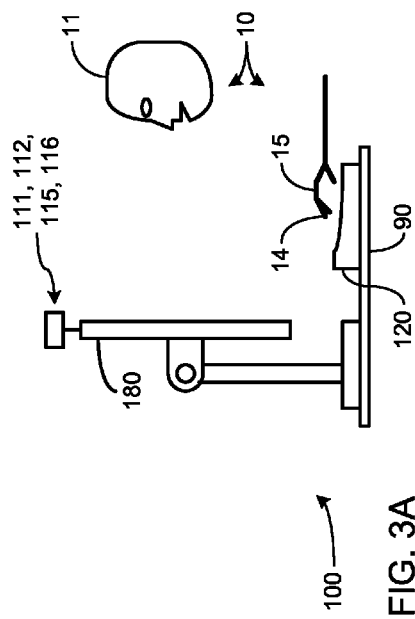

FIG. 3A depicts a scenario of the operator 10 being at a relatively short distance from the controls 120 such that the operator 10 can access the controls 120 with one or both hands 15 (e.g., a hand 15 is proximate the controls 120), and the operator 10 actually does so. Upon detecting this scenario, the processor element 150, in executing the control routine 140, may visually present a view of the visual portion 880 of a user interface to the operator 10 that resembles what is depicted in FIG. 3A. In FIG. 4A, the menus 881a-b and selectable items 882 are presented at a size, including text size, befitting being viewed by the operator 10 at a relatively short distance from the display 180, and befitting use of the controls 120 to select one of the selectable items 882.

Figure 3B:
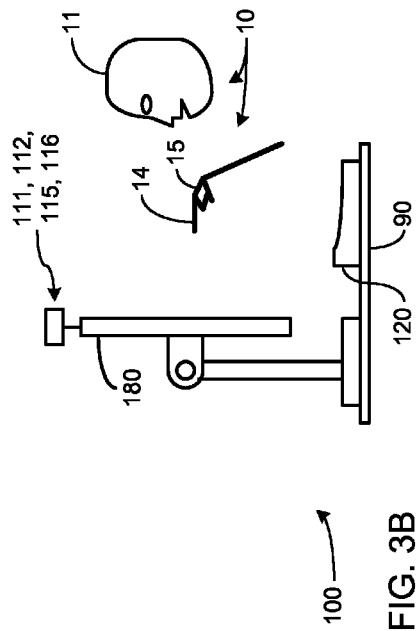

FIG. 3B depicts a scenario of the operator 10 again at a relatively short distance from the controls 120 such that the operator 10 can access the controls 120 with one or both hands 15. However, unlike the scenario of FIG. 3A, in FIG. 3B, the operator raises a hand 15 to a position relative to the screen where the operator 10 is able to point at various selectable items 882 visually presented on the display 180, and forms a digit 14 of that hand 15 to actually do so. Upon detecting this scenario, the processor element 150 may visually present a view of the visual portion 880 of the user interface to the operator 10 that resembles what is depicted in one of FIG. 4B, 4C or 4D as a result of executing the control routine 140.

Figure 4B:
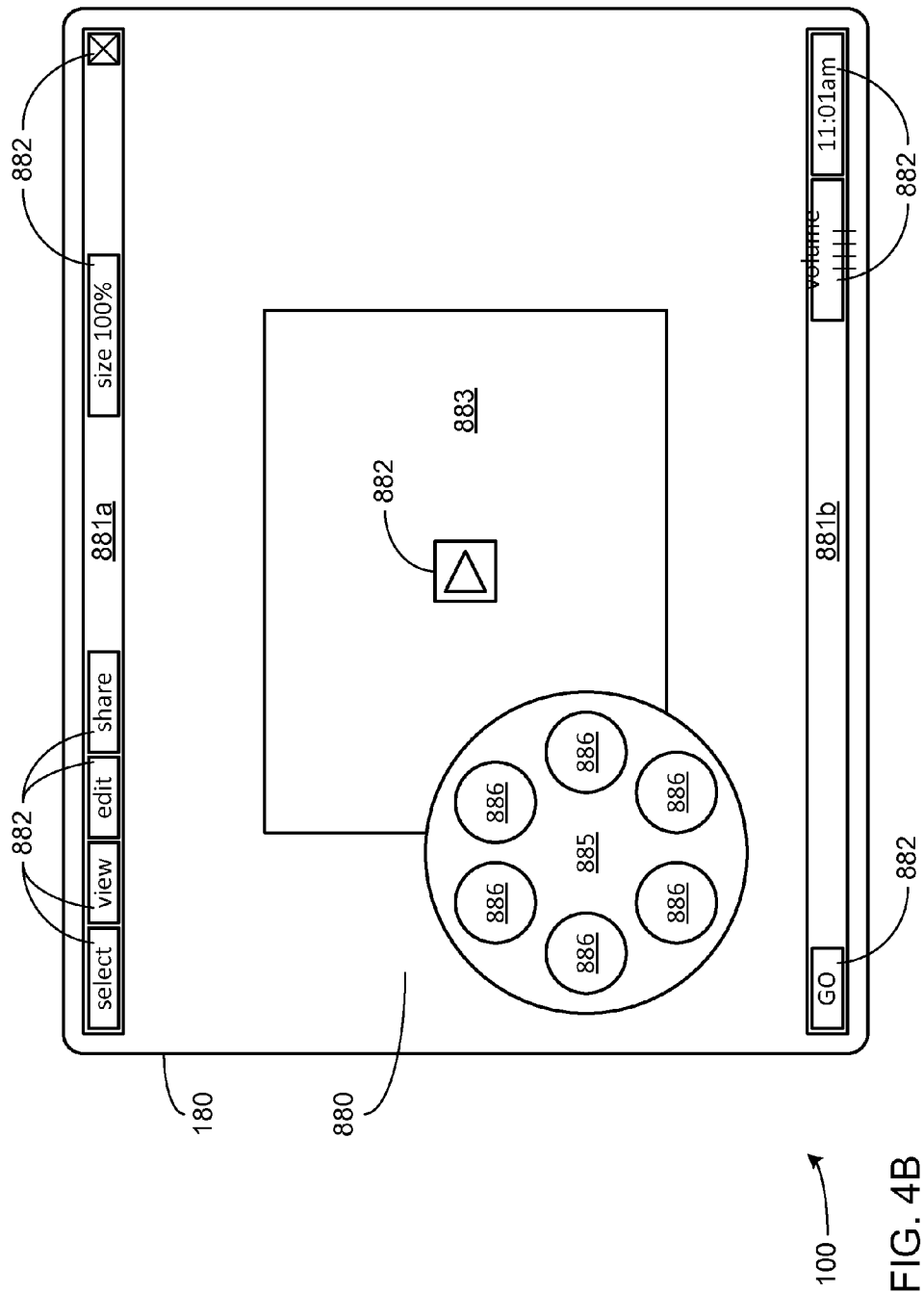

In FIG. 4B, the menus 881a-b and selectable items 882 are presented at substantially the same sizes and locations as in FIG. 4A, but an additional pointing menu 885 is visually presented as overlying other items visually presented on the display 180. The pointing menu 885 incorporates multiple selectable items 886 that duplicate at least some of (not necessarily all of) the selectable items 882 that are visually presented elsewhere. The selectable items 886 are arranged in a generally circular manner around a central point at which no selectable item is located, and the pointing menu 885 is visually presented at a location on the display 180 that is determined by the processor element 150 to be the location to which the operator initially points a digit 14 upon raising a hand 15 to point at the display 180. The pointing menu 885 is based on research suggesting that one efficient form of using a pointed digit of a hand to operate a user interface is to provide selectable items arrayed around a central location that are selected by "twitching" that digit briefly in a selected direction from that central location at which that digit had originally pointed and to which that digit again points following a "twitch" to select a selectable item. A "twitch" herein is a gesture of a digit of a hand in which the digit is initially pointed in a given direction, and then momentarily moved to one side (e.g., up, down, to the left or right) so as to point in a slightly different direction, and moved back again to point in substantially the same or similar direction as before the momentary movement was made. At least the initial movement away from pointing in the given direction is made relatively quickly, though it is envisioned that the movement to return to pointing in substantially the same direction is also made relatively quickly, giving both movements together a quick or "twitch" quality in their speed. Thus, FIG. 4B depicts a possible implementation of such a "point-and-twitch" addition to the user interface in which the processor circuit 150 monitors the image sensor 115 (as it recurringly captures images of the operator 10) for indications of combinations of pointing and twitching of a digit 14 performed by the operator 10.

Figure 4C:
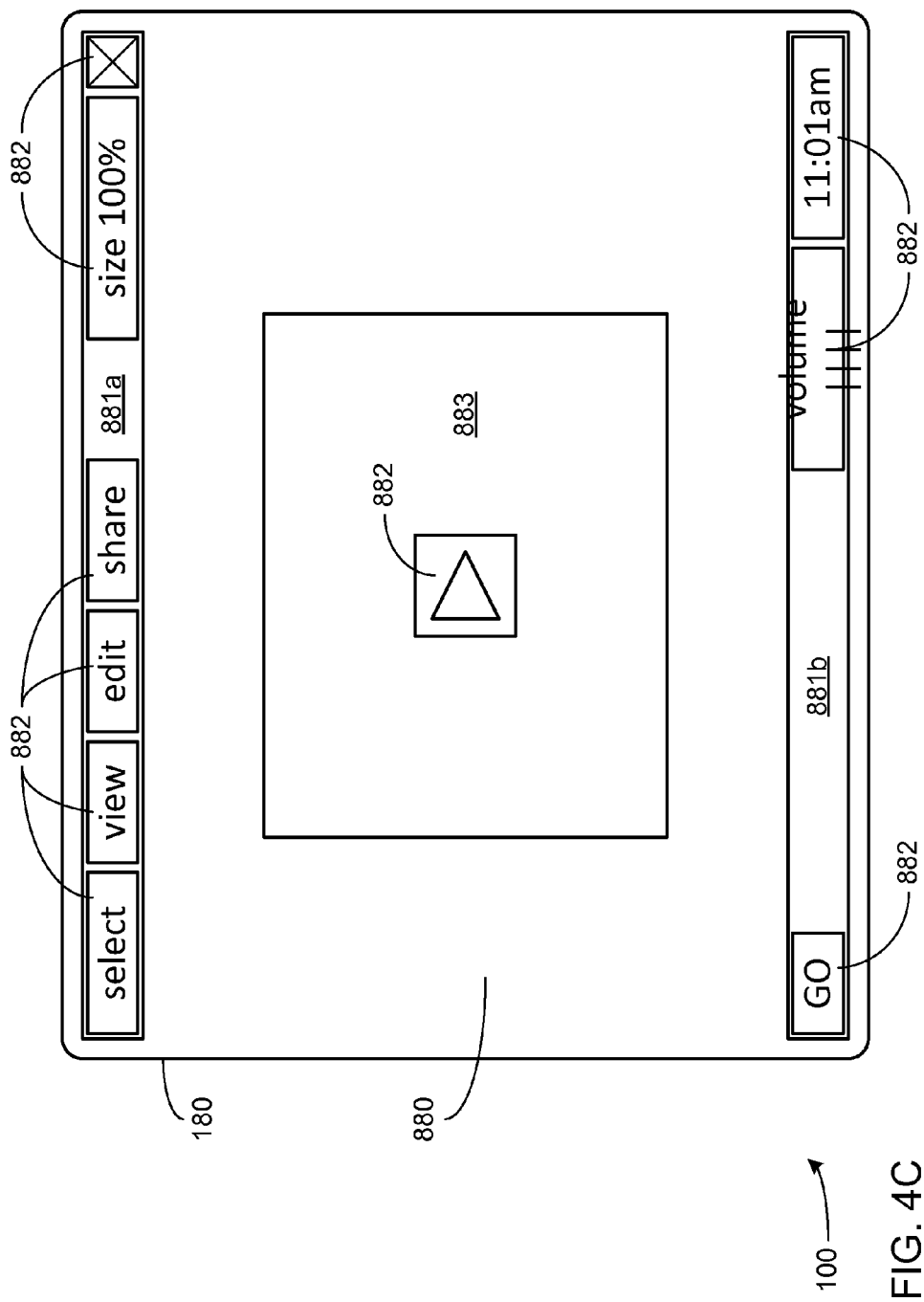

In FIG. 4C, the menus 881a-b and selectable items 882 are presented at substantially the same locations as in FIG. 4A, but in a substantially larger size. This increased size for each of the selectable items 882 (and possibly, the menus 881a-b within which they are disposed) provides the selectable item 882 with larger target areas on the display 180, thereby enhancing the accuracy with which the operator 10 is able to point to a desired one of the selectable items 882 with a digit 14. Along with visually presenting such a view of the visual portion 880 of a user interface as is depicted in FIG. 4C, the processor element 150 also monitors the image sensor 115 (as it recurringly captures images of the operator 10) for instances of the operator 10 pointing at one of the selectable items 882.

Figure 4D:
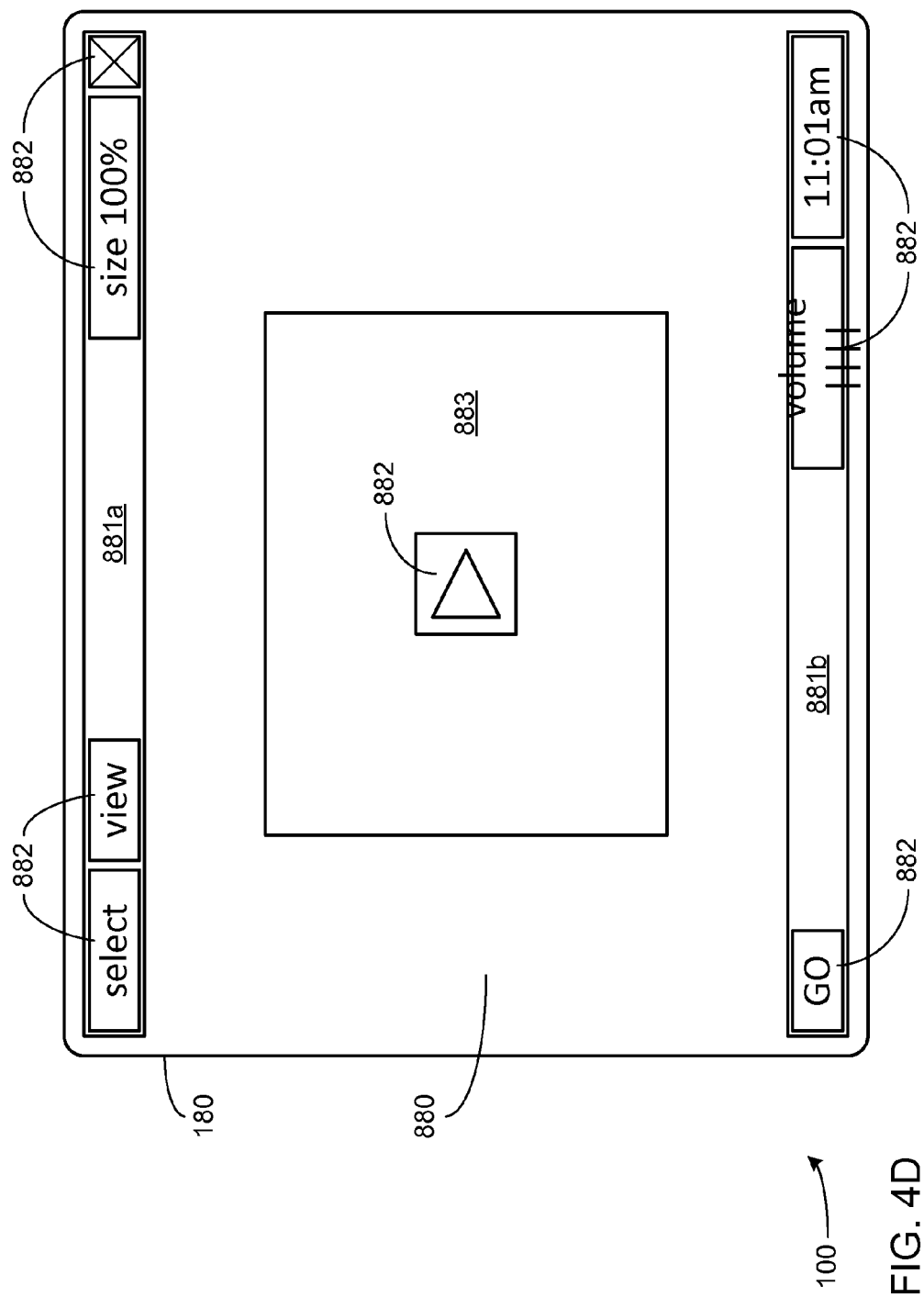

FIG. 4D presents another view of the visual portion 880 of a user interface that is similar to the view of FIG. 4C inasmuch as ones of the selectable items 882 have been increased in size. However, unlike the view depicted in FIG. 4C, the view of FIG. 4D also depicts a simplification of the visual portion 880 inasmuch as some of the selectable items 882 depicted as present in the views of FIGS. 4A-C have been eliminated.

Figure 4E:
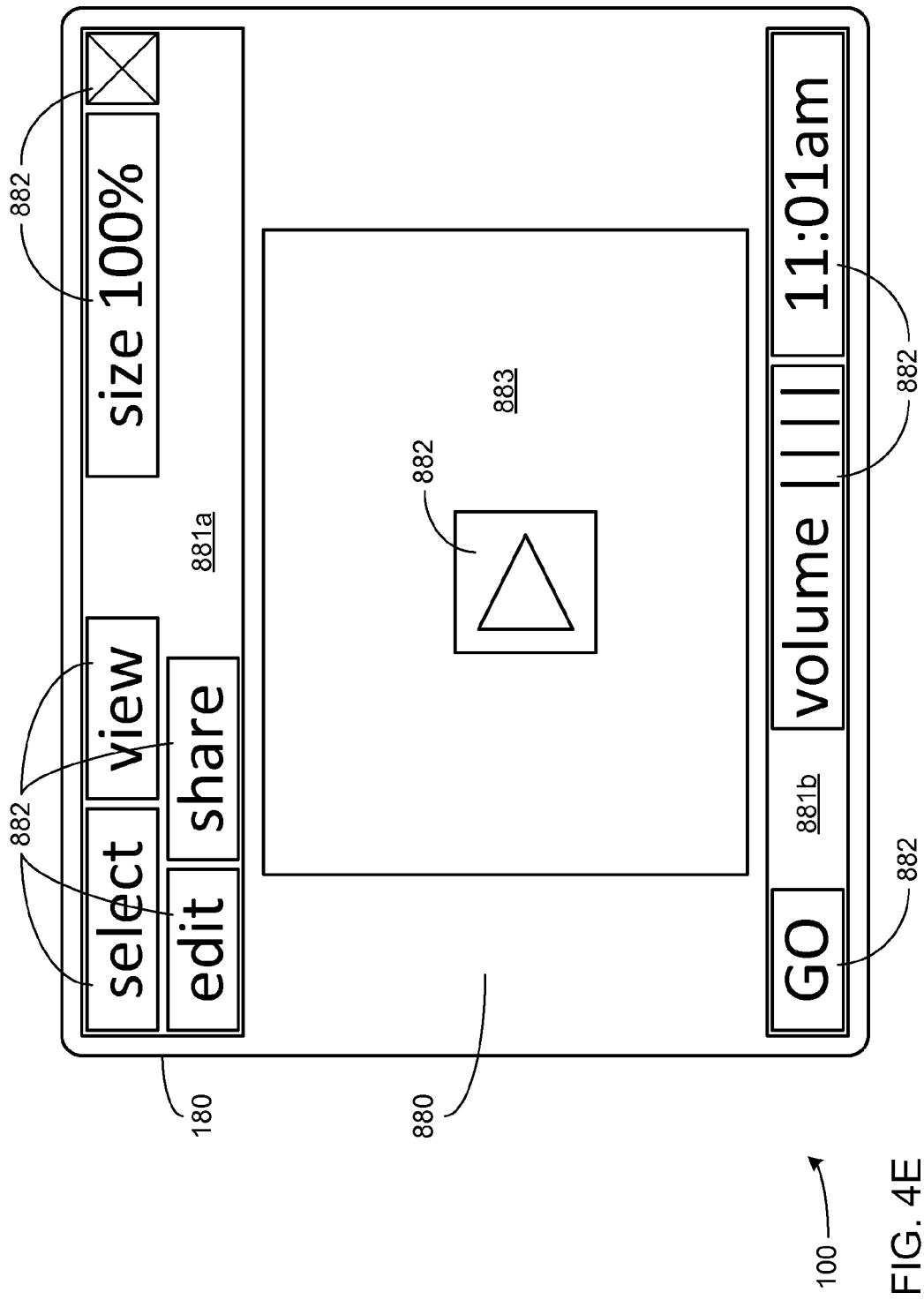

FIG. 3C depicts a scenario of the operator 10 being at a relatively long distance from the controls 120 such that the operator 10 cannot reach the controls 120 with either hand 15 to operate them (e.g., neither hand 15 of the operator 10 is proximate to the controls 120). Further, at such a relatively long distance, the ability of most persons to point with a digit with sufficient accuracy to select one selectable item on a display versus another diminishes considerably. Therefore, upon detecting this scenario, the processor element 150 may visually present a view of the visual portion 880 of a user interface to the operator 10 that resembles what is depicted in FIG. 4E, where each of the selectable items 882 (and possibly, the menus 881a-b within which they are disposed) are again increased in size to a degree still greater than what was depicted in FIGS. 4C-D. This still larger size for the selectable items 882 is not to make them easier to selected by pointing from farther away, but to make them easier to see from farther away while the processor element 150 monitors the image sensor 115 (as it recurringly captures images of the operator 10) for indications of hand gesturing by the operator in place of pointing.

Figure 4F:
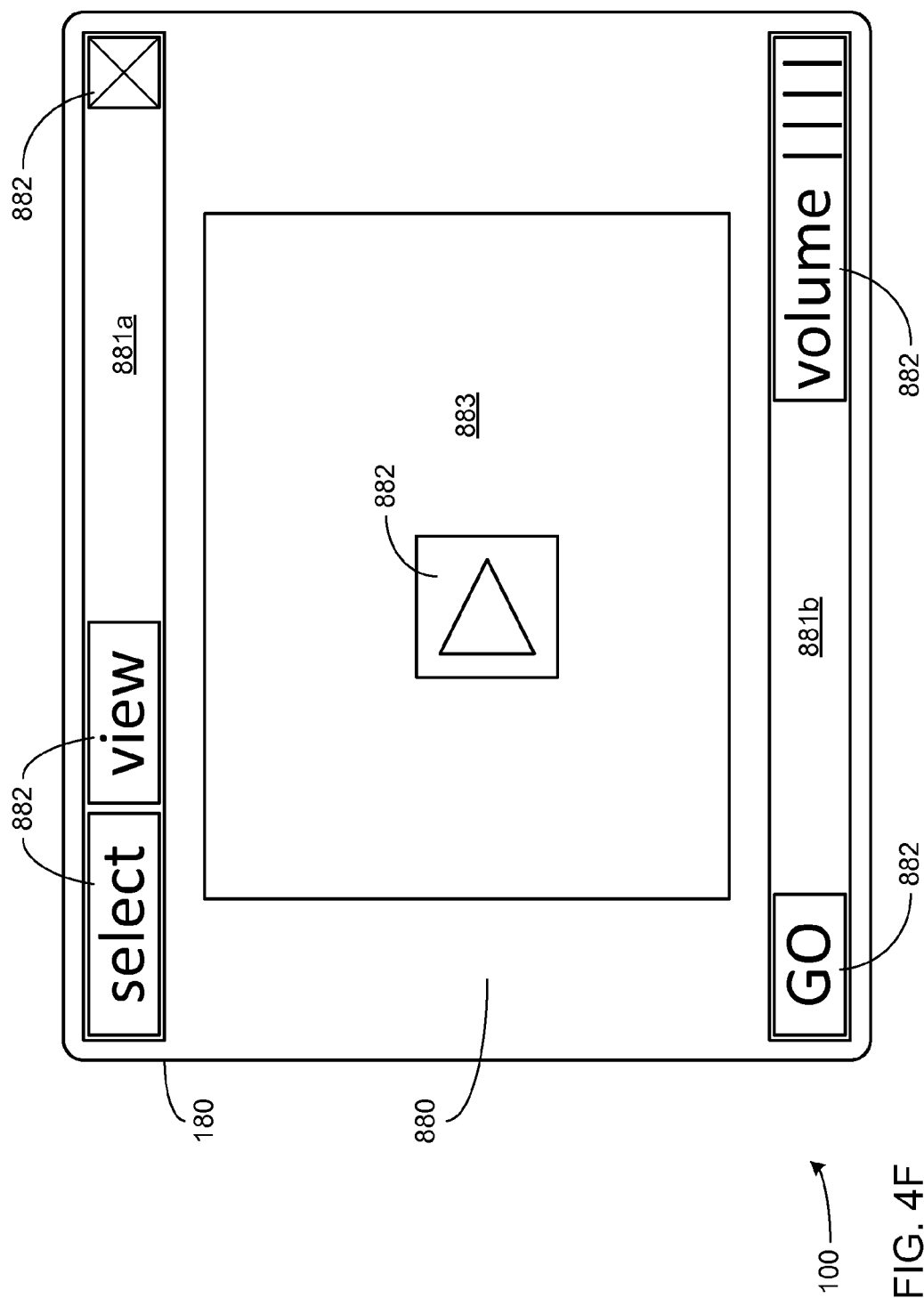

FIG. 4F presents another view of the visual portion 880 of a user interface that is similar to the view depicted in FIG. 4E inasmuch as ones of the selectable items 882 have been increased again in size compared to views of the visual portion 880 depicted in FIGS. 4C-D. However, unlike the view depicted in FIG. 4E, the view of FIG. 4F also depicts a simplification of the visual portion 880 inasmuch as some of the selectable items depicted as present in the view of FIG. 4E have been eliminated.

FIG. 3D depicts a scenario of the operator 10 being at a still greater distance from the controls 120 than the operator 10 was in the scenario of FIG. 3C. Such a greater distance may be beyond a specified distance (as specifically depicted) such that the processor element 150, in executing the control routine 140, may entirely forego interpreting any form of hand gesturing by the operator 10. This may arise from limitations of the image sensor 115 (e.g., limits of its resolution, etc.) in providing the processor element 150 with sufficient detail to analyze hand gestures. Alternatively or additionally, it may be deemed desirable to require that the operator 10 be within the specified distance from the interaction device 100 to operate it so as to avoid encouraging a situation in which the view of the operator 10 is easily or frequently blocked due to activity in the environment and/or in which inattention by the operator 10 at such greater distances allows unauthorized operation of the interaction device 100 by another person.

Upon detecting this scenario, the processor circuit 150 may visually present a login screen requiring such that further operation of the interaction device 100 is not possible until the operator 10 logs in again. Alternatively, the processor circuit 150 may visually present a view of the visual portion 880 of the user interface akin to what is depicted in any of FIGS. 4C to 4F insofar as selectable items are visually presented with sufficient size that they can be seen from the greater distance of the operator 10, but without responding to any hand gestures by the operator 10 until the operator 10 moves closer to shorten the distance.

It should again be noted that such automatic selection of different views of the visual portion 880 of the user interface may be made dynamically as the operator 10 changes position (e.g., changes their distance from a portion of the interaction device 100, such as the controls 120) and/or manner of interaction (e.g., switches between use of the controls 120 and pointing at the display 180) as the operator 10 operates the interaction device 100. For example, in the middle of using the interaction device 100 to perform some manner of function, the operator 10 walk further away or closer to the interaction device 100 such that the automatic selection of a view of the visual portion 880 dynamically changes in response to that change in position as detected by the recurring monitoring of the operator's position.

Returning to FIG. 1, the processor element 150 may condition the interpreting of hand gestures on a determination of whether or not the operator's attention is directed at the interaction device 100 as a result of executing the control routine 140. It may be that hand gestures made an operator are directed at another person or at a different computing device such that the operator does not intend to provide input to the interaction device 100 at a time when the operator is gesturing with one or both hands. In determining this, the processor element 150 may recurringly monitor the direction of the operator's gaze. The processor element 150 may rely on recurringly analyzing images of the operator captured by the image sensor 115 in its field of view to determine the direction of their gaze. Alternatively or additionally, the processor element 150 may rely on the eye tracker 116 (if present) to do so, receiving signals from the eye tracker 116 indicative of the direction of the operator's gaze. Also alternatively or additionally, the processor element 150 may rely on the microphone 112, receiving signals from the microphone 112 indicative of voice commands from the operator to either proceed with interpreting the operator's hand gestures or to ignore the operator's hand gestures.

The processor element 150 may also condition the interpreting of hand gestures on verification of the identity of the operator. Indeed, the acceptance of any input from the operator, including by hand gestures and/or by operation of the controls 120, may be so conditioned. In determining this, the processor element 150 may analyze the images of the face of the operator captured by the image sensor 115 within its field of view, employing any of a variety of known facial recognition algorithms to distinguish the face of the operator from faces of other persons.

Alternatively or additionally, the processor element 150 may analyze one or more captured images of a specific hand gesture made by the operator for purposes of being verified as an authorized operator. Any of a variety of algorithms may be employed to measure the proportions of the digits of that hand and/or other characteristics of that hand to verify that hand as belonging to the operator. In a sense, such a form of verification combines measuring of biometric parameters to confirm the identity of the owner of the hand as being the operator with a gesture-based form of password inasmuch as presumably only the operator knows what gesture to make to be allowed to operate the interaction device 100. For example, the processor element 150 may analyze the shape, size and/or movement of a hand as captured in one more images to derive a three-dimensional (3D) model of that hand that attempts to distinguish locations of joints and endpoints of stiffer structures (e.g., bones, etc.). With such a three-dimensional model thereby created, the processor element 150 may compare the relative lengths of the stiffer structures to known biometric data of an operator's hand to determine whether the hand in the image(s) belongs to that operator. Alternatively or additionally, the processor element 150 may compare the relative angles of the stiffer structures to known data representing a particular gesture to determine whether or not those angles match corresponding angles of the particular gesture closely enough to determine that the particular gesture is being made by the hand in the image(s). Thus, such a derived 3D model may be employed in determining either or both of an operator's identity and what gesture the operator 10 is making.

In still another alternative, the processor element 150 may analyze the voice of the operator as detected by the microphone 112, employing any of a variety of known voice recognition algorithms to distinguish the voice of the operator from voices of other persons. In performing recognition of the operator's face, hand and/or voice, the processor element 150 may be caused to refer to data indicative of biometric parameters of the operator's face, hand and/or voice stored as at least a portion of the identification data 132.

Further, the processor circuit 150 may be caused to perform such verification only while the operator 10 is within a specified distance, possibly a relatively short distance such as the distance depicted in FIGS. 3A-B (e.g., a distance within which a hand 15 is proximate the controls 120 so as to be accessible). This may be deemed desirable to allow the image sensor 115 to have a clear view of the face and/or a hand 15 of the operator 10 for application of algorithms to determine various physical measurements of one or the other for comparison to biometric parameters stored in the identification data 132 as part of verification. Further, requiring the operator 10 to be somewhat closer before verification by hand gesture will be accepted may also be deemed desirable to encourage the operator 10 to not use that particular hand gesture in a manner that is easily viewable by others. Alternatively or additionally, such a requirement of a shorter distance may be deemed desirable to allow the microphone 112 to clearly detect the voice of the operator 10 to better enable measurement of various acoustic parameters of the operator's voice for comparison to biometric parameters stored in the identification data 132 for purposes of verification. However, it may be that requiring the operator 10 to be within a specified distance more like the somewhat longer distance at which non-pointing hand gestures are interpreted (such as is depicted in FIG. 3C) is sufficient for such verification. The processor element 150 may be caused to visually present a login prompt on the display 180 that indicates to the operator the requirement for the operator to be within a specified distance for verification. Further, such a login prompt may be visually presented with characters that vary in size depending on the distance of the operator.

In some embodiments, such verification may be required to allow operation of the interaction device 100, as well as to allow access to data that may be stored within the interaction device 100. Alternatively or additionally, such verification may be required to allow access to data stored on the server 500 through the interaction device 100 and the network 999 extending therebetween. Indeed, each of the interaction device 100 and the server 500 may require different forms of verification. For example, the server 500 may require both voice and facial recognition be performed by the processor element 150 for access to be granted to the operator 10, while access simply to the interaction device 100 itself may require only recognition of the operator's hand used to make a particular gesture to gain access.

It should also be noted that there isn't necessarily a one-to-one correspondence between operators and the hand gestures the operator 10 makes to be logged in (i.e., have their identity verified as an authorized operator). For example, it may be that there is "group gesture" used by multiple operators to log into (or be verified) as an authorized operator on the same interaction device 100 such that any of those operators may be permitted to operate the interaction device 100. Also for example, it may be that a single operator has multiple accounts on the interaction device 100 and/or the server 500 (e.g., a personal account vs. a business account, or a regular business operations account vs. a "super user" account providing greater access privileges) that are each logged into through use of a different gesture.

It should still further be noted that gestures related to access for one or more operators may be given additional meaning beyond granting the ability to operate the interaction device 100 and/or gain access to data stored on the server 500. By way of example, the ability of the interaction device 100 to analyze hand gestures and/or identify authorized operators through recognition of hands of authorized operators may be used to additionally control other devices entirely unrelated to the interaction device 100, itself, such as automated locks on doors to rooms or cabinets in the vicinity of the interaction device 100. Perhaps the interaction device 100 may be employed to selectively grant access to secure printouts of sensitive information from a nearby printer, etc.

In various embodiments, each of the processor elements 150 and 250 may include any of a wide variety of commercially available processors. Further, one or more of these processor elements may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 160 and 260 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interface 190 employs any of a wide variety of signaling technologies enabling the computing device 100 to be coupled through the network 999 as has been described. Each of these interfaces includes circuitry providing at least some of the requisite functionality to enable such coupling. However, this interface may also be at least partially implemented with sequences of instructions executed by the processor element 150 (e.g., to implement a protocol stack or other features). Where one or more portions of the network 999 employs electrically and/or optically conductive cabling, the interface 190 may employ signaling and/or protocols conforming to any of a variety of industry standards, including without limitation, RS-232C, RS-422, USB, Ethernet (IEEE-802.3) or IEEE-1394. Alternatively or additionally, where one or more portions of the network 999 entails the use of wireless signal transmission, the interface 190 may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although each of the interfaces 190 and 390 are depicted as a single block, one or more of these may include multiple interfaces that may be based on differing signaling technologies. This may be the case where one or more of these interfaces couples corresponding ones of the computing devices 100 and 300 to more than one network, each employing differing communications technologies.

Figure 5:
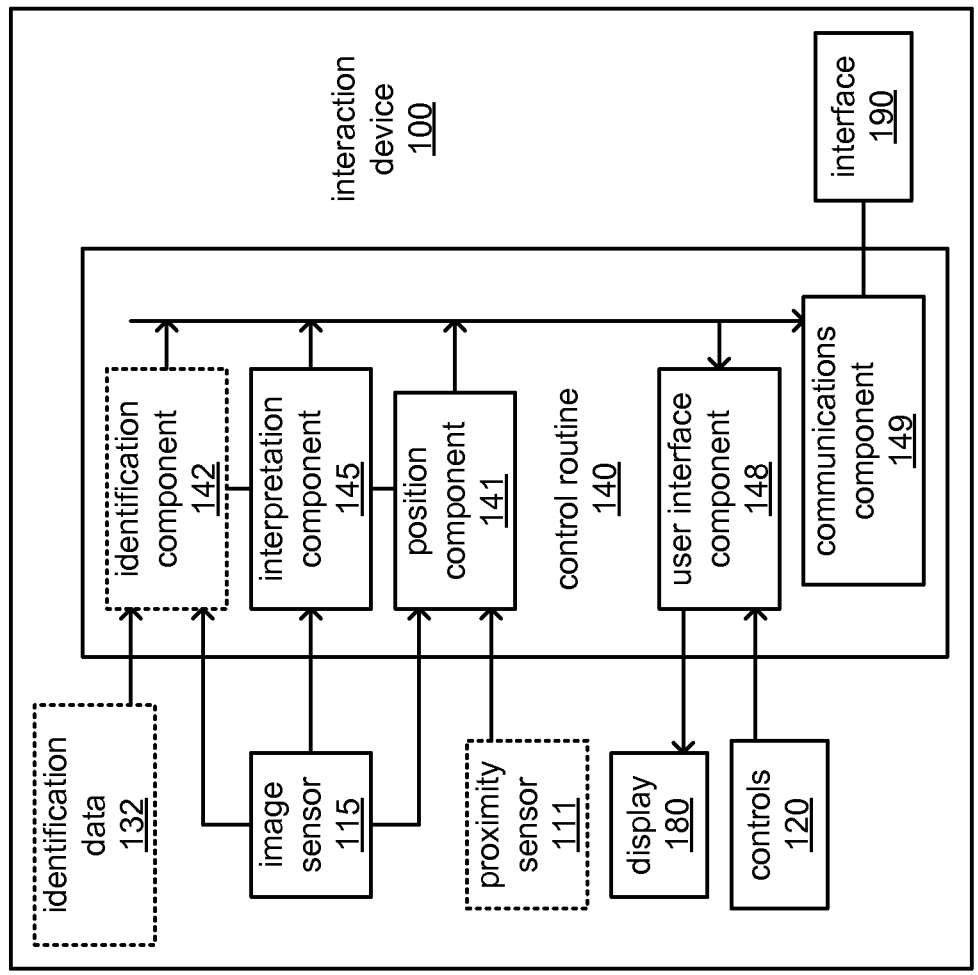
FIGS. 5 and 6 illustrate aspects of the embodiment of FIG. 1.
Figure 6:
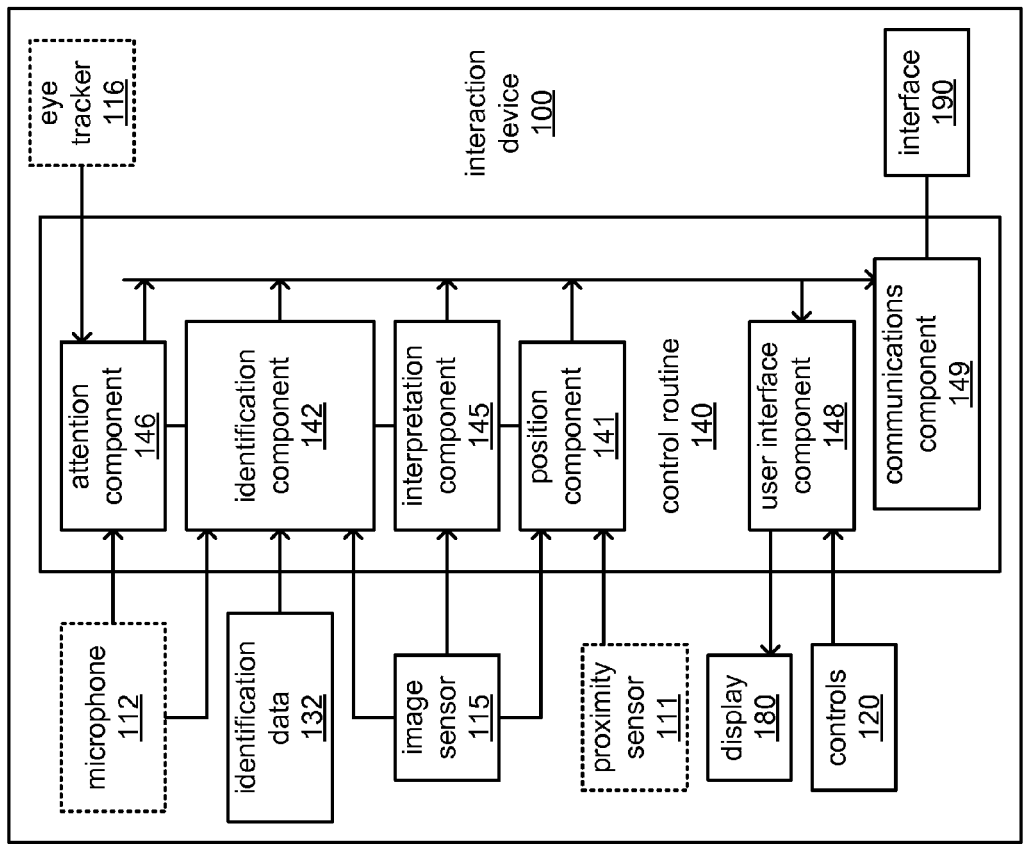

FIGS. 5 and 6 each illustrate a block diagram of a possible embodiment of the interaction device 100 of FIG. 1 in greater detail, with the embodiment of FIG. 6 having additional features not found in the embodiment of FIG. 5. More specifically, aspects of the operating environment of the computing device 100 are depicted in which the processor element 150, in executing the control routine 140, performs the aforedescribed functions. As will be recognized by those skilled in the art, the control routine 140, including the components of which it is composed, is selected to be operative on whatever type of processor or processors that are selected to implement the processor element 150.

In various embodiments, the control routine 140 may include a combination of an operating system, device drivers and/or application-level routines (e.g., so-called "software suites" provided on disc media, "applets" obtained from a remote server, etc.). Where an operating system is included, the operating system may be any of a variety of available operating systems, including without limitation, Windows™, OS X™, Linux®, or Android OS™. Where one or more device drivers are included, those device drivers may provide support for any of a variety of other components, whether hardware or software components, of the computing device 100.

The control routine 140 may include a communications component 149 executable by the processor element 150 to operate the interface 190 to transmit and receive signals via the network 999 as has been described. As will be recognized by those skilled in the art, this communications component is selected to be operable with whatever type of interface technology is selected to implement this interface.

The control routine 140 includes a position component 141 executable by the processor element 150 to either analyze images of an operator captured by the image sensor 115 or use indications of distance of the operator received from the proximity sensor 111 (if present) to determine the distance of the operator from a portion of the computing device 100. As has been discussed, the portion of the computing device from which a distance to the position of the operator is measured may be the controls 120 to determine whether or not the operator is within a short enough distance to be able to operate the controls 120.

The control routine 140 may include an identification component 142 executable by the processor element 150 to analyze images one or more portions of an operator's body in images captured by the image sensor 115 to verify the identity of the operator. Turning briefly to FIG. 6, the identification component 142 may alternatively or additionally analyze speech of the operator as detected by the microphone 112 (if present) to verify the operator. As previously discussed, regardless of which form of analysis is used, comparisons are made to biometric data of the operator stored in the identification data 132 as part of such verification.

The control routine 140 includes an interpretation component 145 executable by the processor element 150 to analyze images captured by the image sensor 115 to interpret hand gestures of an operator and/or the direction in which the operator is pointing with a digit of one of a hand. As has been discussed, the hand gestures may include movement or poses of one or more digits of one or both of the operator's hands, including movements or poses conveying portions of a sign language.

The control routine 140 includes a user interface component 148 executable by the processor element 150 to provide a user interface for interactions of an operator with the computing device 100. The user interface component 148 receives signals indicative of manual operation of the controls 120 and/or receives indications of interpretations of hand gestures and/or pointing of fingers from the interpretation component 145 as inputs. The user interface component 148 also receives indications of distance of the operator from the position component 141 and indications of whether or not the operator has been verified from the identification component 142 in determining what view of the visual portion 880 of the user interface to visually present on the display 180, as has been described. Further, the user interface component 148 may employ indications of whether or not the operator is verified in being triggered to visually present a login prompt in lieu of any of the distance-dependent views of the user interface.

Turning specifically to FIG. 6, the control routine 140 may include an attention component 146 executable by the processor element 150 to determine whether an operator's attention is directed towards the computing device 100, or not. The attention component 146 may interpret speech of the operator detected by the microphone 112 (if present) to discern explicit verbal commands from the operator to either proceed with interpreting the operator's hand gestures or not. Alternatively or additionally, the attention component 146 receives signals from the eye tracker 116 (if present) indicative of whether the gaze of the operator is directed towards the display 180 or not, the presumption being that the operator will look in the direction of the display 180 when pointing with a digit at it or making hand gestures to select a selectable item that is visually presented thereon. As an alternative to the eye tracker 116, the attention component may analyze images recurringly captured by the image sensor 115 for an indication of where the operator's gaze is directed.

Figure 7:
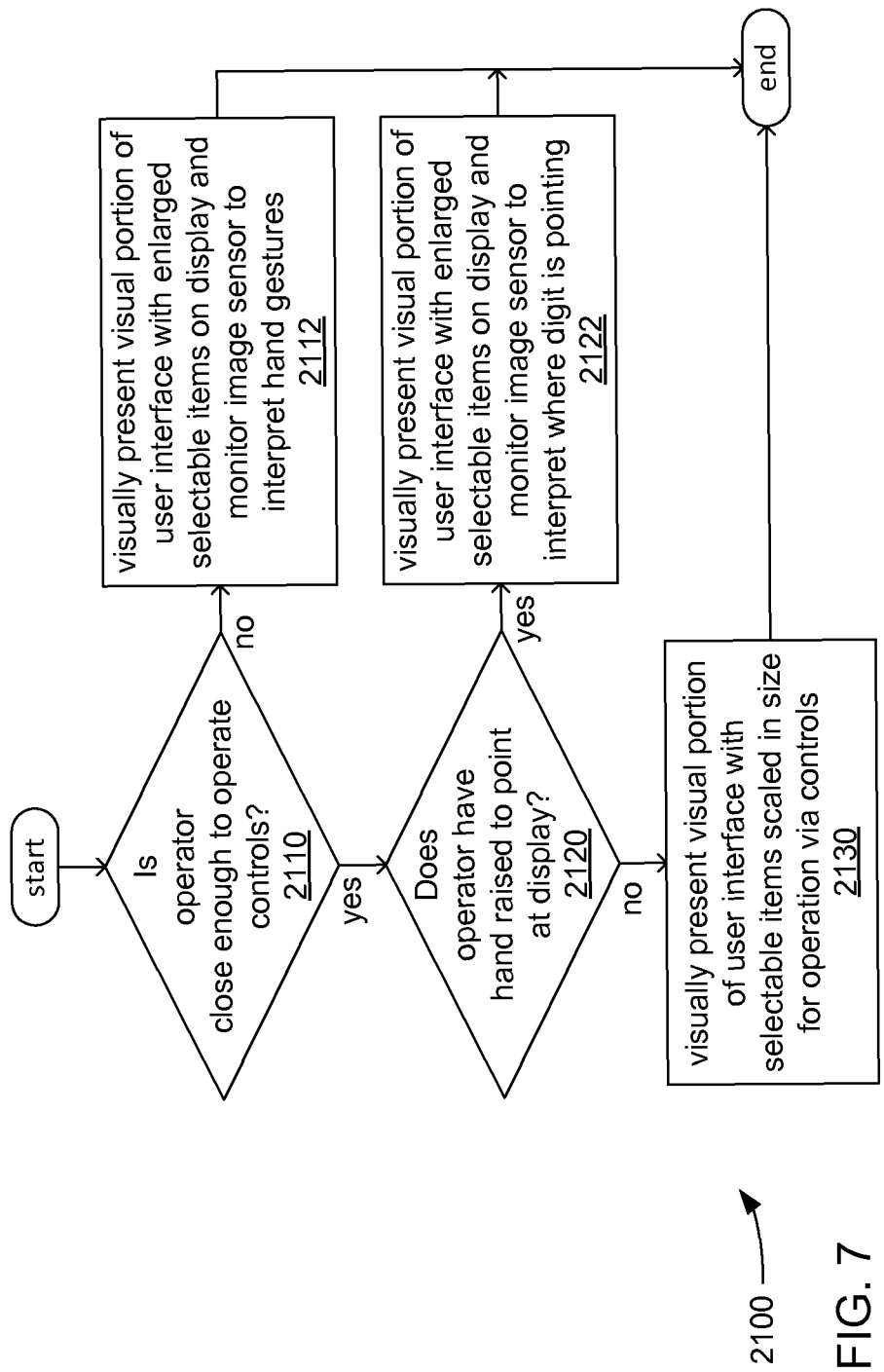
FIG. 7 illustrates a first logic flow according to an embodiment.

FIG. 7 illustrates one embodiment of a logic flow 2100. The logic flow 2100 may be representative of some or all of the operations executed by one or more embodiments described herein. More specifically, the logic flow 2100 may illustrate operations performed by the processor element 150 of the interaction device 100 in executing at least the control routine 140.

At 2110, a check is made as to whether an operator of a computing device (e.g., the interaction device 100) is close enough to a portion of the computing device to operate controls of the computing device (e.g., whether a hand 15 of an operator 10 is proximate the controls 120 of the interaction device 100). If not, then the computing device visually presents a view of a visual portion (e.g., the visual portion 880) of its user interface in which selectable items are enlarged in size on a display of the computing device, and monitors an image sensor of the computing device to interpret hand gestures at 2112. As has been discussed, such hand gestures may entail the use of one or both hands, may involve movement and/or a pose of a digit or an entire hand, and may be gestures of a language such as ASL However, if the operator is close enough to operate the controls (e.g., if a hand 15 is proximate the controls 120 such that they are accessible to the operator 10), then at 2120, a check is made as to whether the operator has a hand raised to point at the display. If so, then the computing device visually presents a view of the visual portion of its user interface in which selectable items are enlarged in size on the display, and monitors the image sensor to interpret where a digit of the raised hand is pointing at the display at 2122. As previously discussed, the enlargement of selectable items increases their target area (i.e., the amount of viewable area that each takes up on a display) to enhance the accuracy with which an operator is able to point at them.

However, if the operator does not have a hand raised to point at the display, then at 2130 the computing device visually presents a view of the visual portion of its user interface in which selectable items are of a smaller size scaled for operation of the computing device through the controls. This view of the visual portion of the user interface is envisioned to be the normal view employed with many computing devices at times when a keyboard, mouse, trackball, touchpad, etc. is used as a manually-operable control for operator input.

Figure 8:
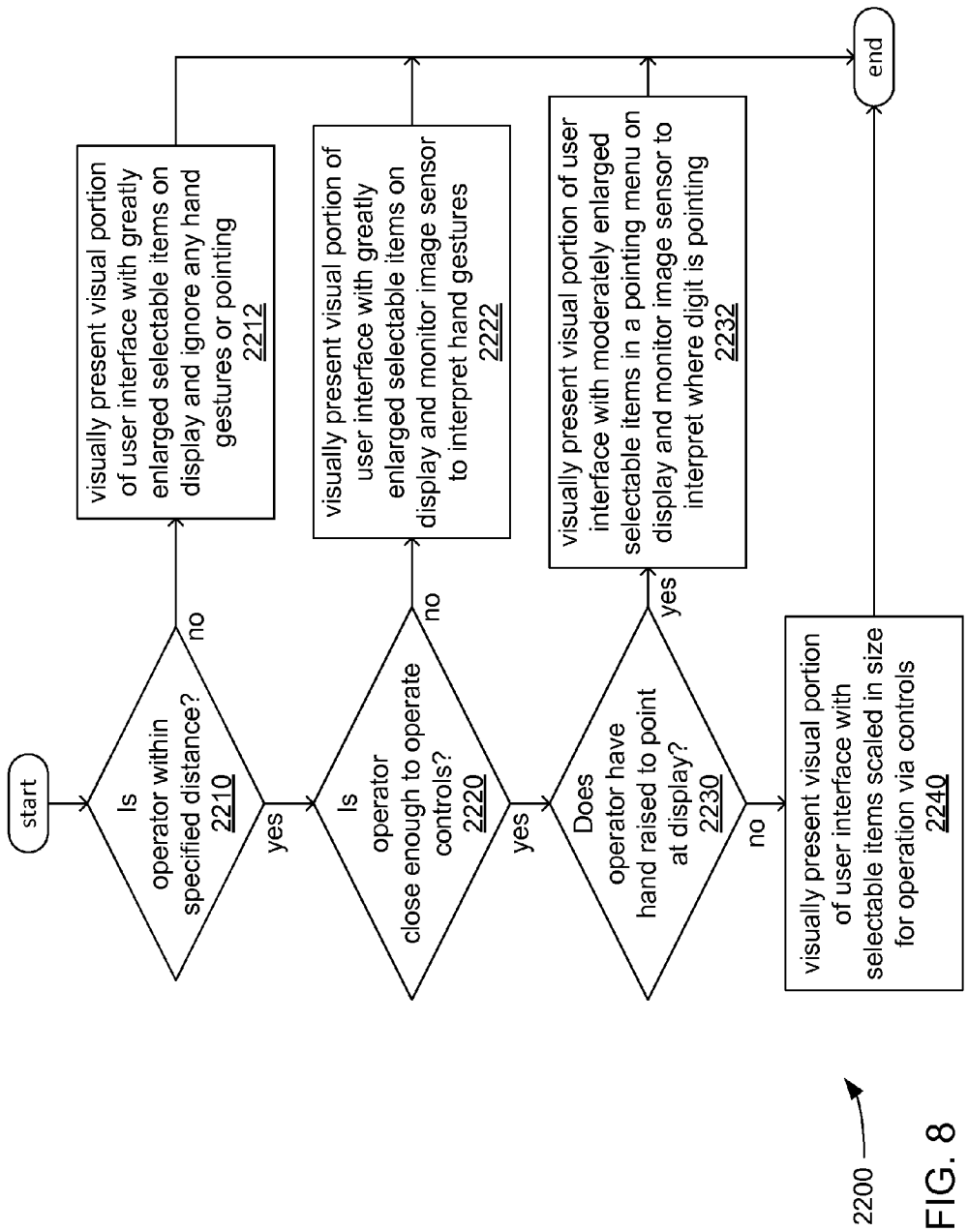
FIG. 8 illustrates a second logic flow according to an embodiment.

FIG. 8 illustrates one embodiment of a logic flow 2200. The logic flow 2200 may be representative of some or all of the operations executed by one or more embodiments described herein. More specifically, the logic flow 2200 may illustrate operations performed by the processor elements 150 of the interaction device 100 in executing at least the control routine 140.

At 2210, a check is made as to whether an operator of a computing device (e.g., the interaction device 100) is within a specified distance of a portion of the computing device (e.g., the display 180 or the controls 120 of the interaction device 100). If not, then the computing device visually presents a view of a visual portion of its user interface in which selectable items are greatly enlarged in size on a display of the computing device (e.g., the display 180), and ignores all hand gestures made by the operator at 2212. As previously discussed, such a view of a visual portion of a user interface is to display the selectable items with sufficient size to be more easily seen by the operator from some distance away, even though the operator must come closer to select any of them.

However, if the operator is within the specified distance, then at 2220, a check is made as to whether the operator is close enough to a portion of the computing device to operate controls of the computing device (e.g., whether a hand 15 of the operator 10 is proximate the controls 120 such that the controls 120 are accessible). If not, then the computing device visually presents a view of a visual portion of its user interface in which selectable items are greatly enlarged in size on the display, and monitors an image sensor of the computing device to interpret hand gestures at 2222. It may be that the greatly enlarged size of the selectable items in this view is substantially similar to the view caused to be visually displayed at 2212.

However, if the operator is close enough to operate the controls (e.g., a hand 15 of the operator 10 is proximate to the controls 120), then at 2230, a check is made as to whether the operator has a hand raised to point at the display. If so, then the computing device visually presents a view of the visual portion of its user interface in which selectable items are enlarged in size on the display in a pointing menu (e.g., the pointing menu 885), and monitors the image sensor to interpret instances where a digit of the raised hand is pointing at the display and is then moved in a "twitch" movement to select a selectable item of the point menu at 2232. As previously discussed, the enlargement of the of the selectable items for this view in which pointing gestures are used may not be as great as for the views visually presented at either 2212 or 2222. As also previously discussed the selectable items of the pointing menu (e.g., the selectable items 886) may be duplicates of selectable items elsewhere in this view of a visual portion of a user interface (e.g., the selectable items 882).

However, if the operator does not have a hand raised to point at the display, then at 2240 the computing device visually presents a view of the visual portion of its user interface in which selectable items are of a smaller size scaled for operation of the computing device through the controls. Again, this view of the visual portion of the user interface is envisioned to be the normal view employed with many computing devices at times when a keyboard, mouse, trackball, touchpad, etc. is used as a manually-operable control for operator input.

Figure 9:
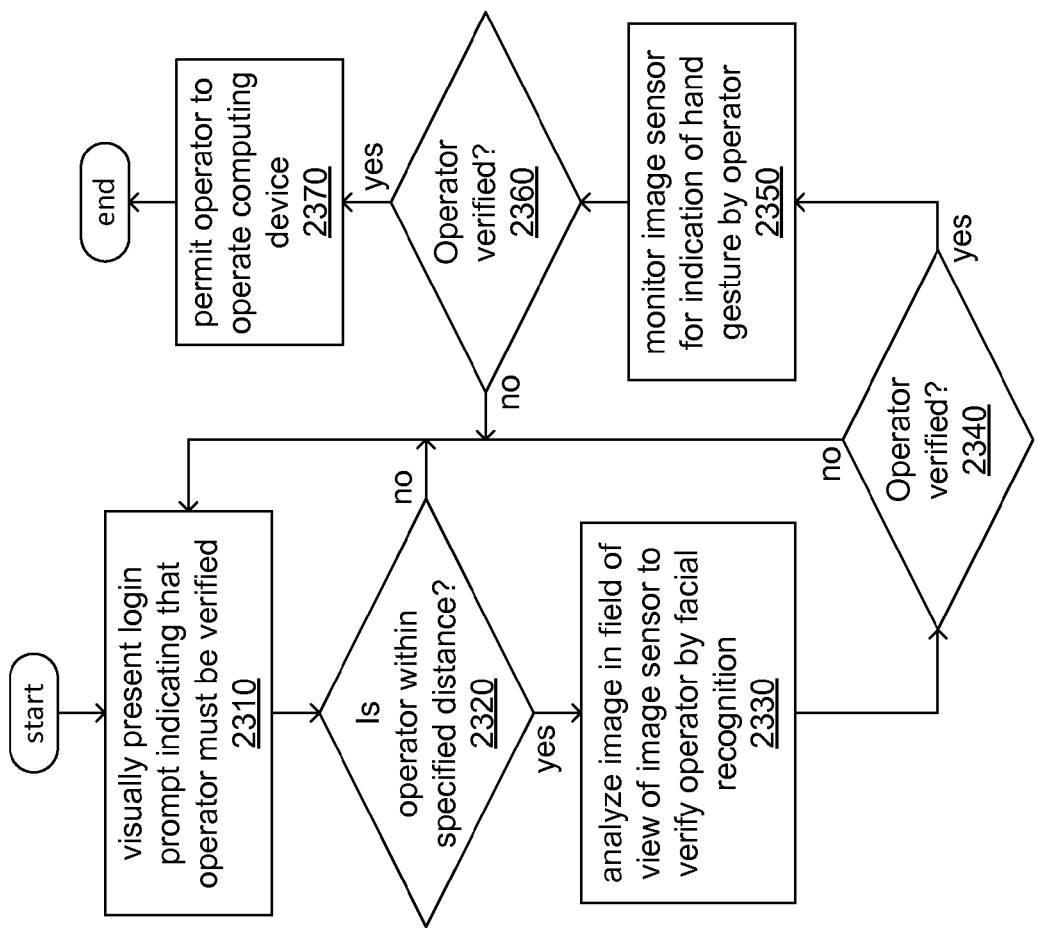
FIG. 9 illustrates a third logic flow according to an embodiment.

FIG. 9 illustrates one embodiment of a logic flow 2300. The logic flow 2300 may be representative of some or all of the operations executed by one or more embodiments described herein. More specifically, the logic flow 2200 may illustrate operations performed by the processor element 150 and/or 250 of the interaction device 100 in executing at least the control routine 140 and/or 240.

At 2310, a computing device (e.g., the interaction device 100) visually presents a login prompt on a display of the computing device (e.g., the display 180) indicating that the operator of the computing device must be verified. As the prompt is presented, the text of the prompt may be increased or decreased in size as the operator moves closer to or further away from the computing device.

At 2320, a check is made as to whether an operator is within a specified distance of a portion of the computing device (e.g., the display 180 or the controls 120 of the interaction device 100). If not, then the computing device continues to visually present the login prompt on the display, and no gestures made by the operator are responded to. As has been discussed, it may be necessary to require the operator to be within the specified distance to enable an image sensor of the computing device to detect their facial features and/or a gesture for logging in with sufficient clarity, given its characteristics. As has also been discussed, it may be deemed desirable to require the operator to be with the specified distance to encourage the operator not to make their gesture for logging onto the computing device in a manner that can be too easily seen by others.

If the operator is within the specified distance, then the computing device analyzes the image in the field of view of the image sensor to verify the operator by facial recognition at 2330. If the operator is not verified at 2340, then the computing device continues to visually present the login prompt. However, if the operator is verified by facial recognition at 2340, then the computing device analyzes the image in the field of view of the image sensor to further verify the operator by hand gesture at 2350. In some embodiments, the computing device may visually present a different prompt indicating that the operator should make a hand gesture for logging onto the computing device. As previously discussed, the hand gesture may be a particular movement and/or pose with one or more digits of one or both hands.

If the operator is not verified at 2360, then the computing device continues to visually present the login prompt. However, if the operator is verified at 2360, then the computing device permits the operator to operate the computing device at 2370.

Figure 10:
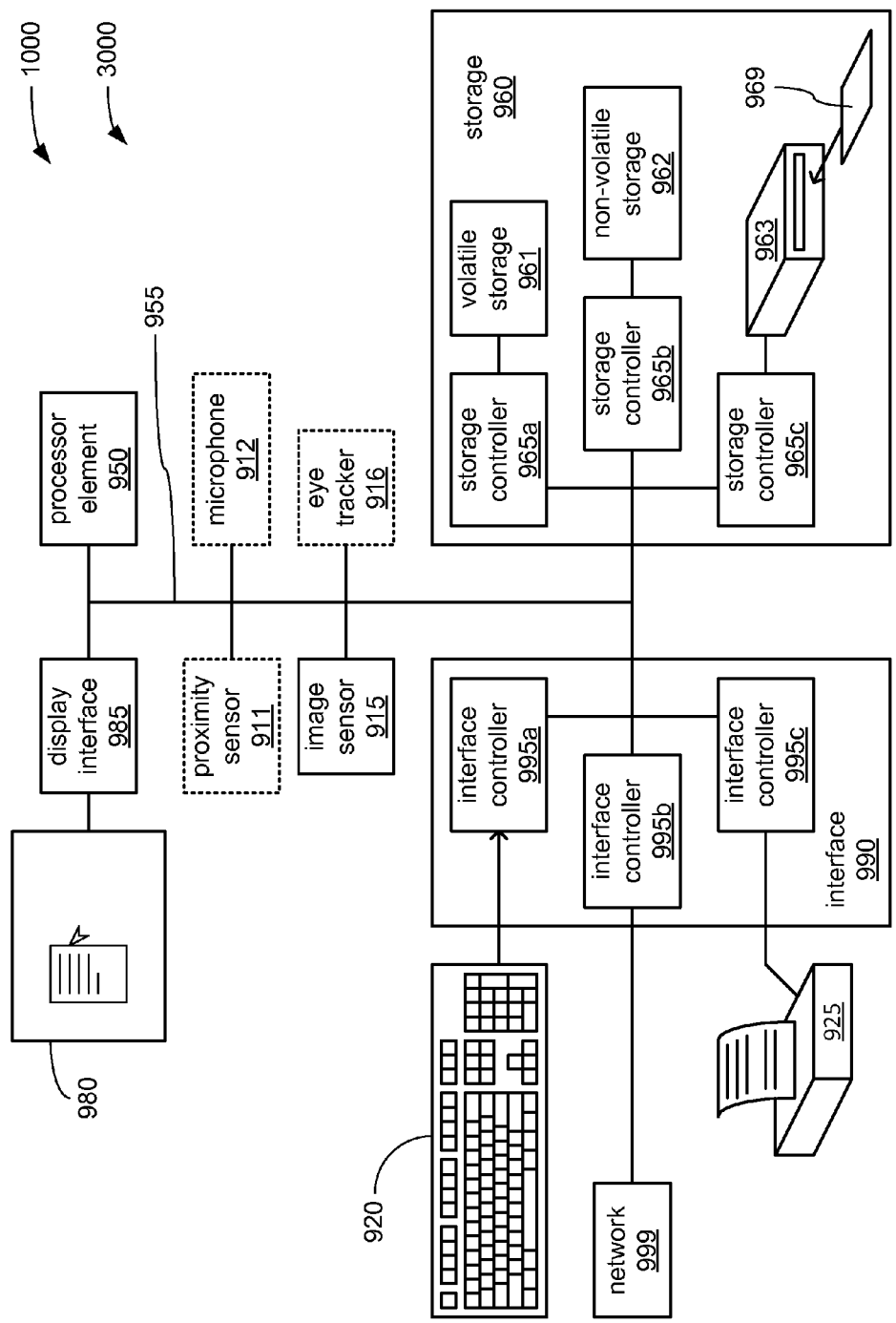
FIG. 10 illustrates a processing architecture according to an embodiment.

FIG. 10 illustrates an embodiment of an exemplary processing architecture 3000 suitable for implementing various embodiments as previously described. More specifically, the processing architecture 3000 (or views thereof) may be implemented as part of one of the views of the computing device 100 or the controller 200. It should be noted that components of the processing architecture 3000 are given reference numbers in which the last two digits correspond to the last two digits of reference numbers of components earlier depicted and described as part of the computing device 100 and the controller 200. This is done as an aid to correlating such components of the computing device 100 and the controller 200 to components of this exemplary processing architecture.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.)

that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3000, a computing device incorporates at least a processor element 950, a storage 960, an interface 990 to other devices, and coupling 955. Depending on various aspects of a computing device implementing the processing architecture 3000, including its intended use and/or conditions of use, such a computing device may further incorporate additional components, such as without limitation, a proximity sensor 911, a microphone 912, an image sensor 915 and/or an eye tracker 916.

The coupling 955 incorporates one or more buses, point-to-point interconnects, transceivers, buffers, crosspoint switches, and/or other conductors and/or logic that communicatively couples at least the processor element 950 to the storage 960. The coupling 955 may further couple the processor element 950 to one or more of the interface 990 and the display interface 985 (depending on which of these and/or other components are also present). With the processor element 950 being so coupled by couplings 955, the processor element 950 is able to perform the various ones of the tasks described at length, above, for the computing device 100 and/or the controller 200. The coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor element 950 (corresponding to one or more of the processor elements 150 and 250) may include any of a wide variety of commercially available processors, employing any of a wide variety of technologies and implemented with one or more cores physically combined in any of a number of ways.

As previously discussed, the storage 960 (corresponding to one or more of the storages 160 and 260) may include one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor element 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of removable machine-readable storage media 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage media 969.

One or the other of the volatile storage 961 or the non-volatile storage 962 may include an article of manufacture in the form of a machine-readable storage media on which a routine comprising a sequence of instructions executable by the processor element 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor element 950 may initially be stored on the machine-readable storage media 969, and the removable media storage 963 may be subsequently employed in copying that routine to the non-volatile storage 962 for longer term storage not requiring the continuing presence of the machine-readable storage media 969 and/or the volatile storage 961 to enable more rapid access by the processor element 950 as that routine is executed.

As previously discussed, the interface 990 (corresponding to the interface 190) may employ any of a variety of signaling technologies corresponding to any of a variety of communications technologies that may be employed to communicatively couple a computing device to one or more other devices. Again, one or both of various forms of wired or wireless signaling may be employed to enable the processor element 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also incorporate the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices 200 and 700 may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Example 1 is an apparatus to manage a user interface that includes an image sensor to capture at least one image of an operator, and a position component communicatively coupled to the image sensor to determine a proximate distance of the operator to a manually-operable control and to provide the determination of the distance to a user interface component to enable dynamic selection of one of multiple views of a visual portion of a user interface.

Example 2 includes the subject matter of Example 1, and includes the user interface component, the user interface component communicatively coupled to the position component to dynamically select and visually present a first view of the visual portion of a user interface comprising a selectable item in response to a determination that the operator is proximate to the control, and to dynamically select and visually present a second view of the visual portion of the user interface in response to a determination that the operator is not proximate to the control, the selectable item visually presented in a larger size in the second view than in the first view.

Example 3 includes the subject matter of any of Examples 1-2, in which the user interface component is communicatively coupled to the control to receive signals indicative of operation of the control to select the selectable item in response to the determination that the operator is proximate to the control.

Example 4 includes the subject matter of any of Examples 1-3, in which the user interface component is to dynamically select and visually present a third view of the visual portion of the user interface in response to a determination that the distance is greater than a selected distance, the selected distance great enough to preclude access by the operator to the control, and the selected item visually presented in the third view in a size larger than the size of the selected item in either of the first and second views.

Example 5 includes the subject matter of any of Examples 1-4, and includes an identification component communicatively coupled to the image sensor to determine a measurement of a hand of the operator from the at least one image and to compare the measurement to biometric data of the hand of the operator to verify the operator, the user interface component communicatively coupled to the identification component to visually present a login prompt to the operator.

Example 6 includes the subject matter of any of Examples 1-5, and includes an interpretation component communicatively coupled to the image sensor and the position component, the interpretation component to analyze the at least one image to interpret a hand gesture of the operator to select the selectable item in response to the determination that the operator is not proximate to the control.

Example 7 includes the subject matter of any of Examples 1-6, and includes an eye tracker to track a direction of gaze of the operator, and an attention component communicatively coupled to the eye tracker and the interpretation component to condition interpretation of the hand gesture on a determination of whether the gaze of the operator is directed towards a display.

Example 8 includes the subject matter of any of Examples 1-7, in which the interpretation component is to ignore all hand gestures of the operator in response to a determination that the distance is greater than a selected distance, the selected distance great enough to preclude access by the operator to the control.

Example 9 includes the subject matter of any of Examples 1-8, and includes an identification component communicatively coupled to the image sensor and to the user interface component to determine a measurement of a hand of the operator from the at least one image and to compare the measurement to biometric data of the hand of the operator to verify the operator, the user interface component to visually present a login prompt to the operator.

Example 10 includes the subject matter of any of Examples 1-9, in which the identification component is to analyze a hand gesture of the operator in the at least one image to verify the operator.

Example 11 includes the subject matter of any of Examples 1-10, and includes a proximity sensor, the position component communicatively coupled to proximity sensor to determine the distance of the operator from the manually-operable control from a signal indicative of the distance received from the proximity sensor.

Example 12 includes the subject matter of any of Examples 1-11, in which the position component to analyze the at least one image to determine the distance of the operator from the manually-operable control.

Example 13 is an apparatus to manage a user interface that includes an image sensor to capture at least one image of an operator, and an interpretation component communicatively coupled to the image sensor to analyze the at least one image to determine whether a hand of the operator is raised towards a display to point at the display, and to provide the determination of whether the hand is raised towards the display to a user interface component to enable dynamic selection of one of multiple views of a visual portion of a user interface.

Example 14 includes the subject matter of Example 13, and includes the user interface component, the user interface component communicatively coupled to the interpretation component to dynamically select and visually present a first view of a visual portion of a user interface comprising a selectable item in response to a determination that the hand is not raised towards the display to point at the display, and to dynamically select and visually present a second view of the visual portion of the user interface in response to a determination that the hand is raised towards the display to point at the display, the selectable item visually presented in different sizes in the first and second views.

Example 15 includes the subject matter of any of Examples 13-14, and includes a manually-operable control, the user interface component communicatively coupled to the manually-operable control to receive signals indicative of operation of the control to select the selectable item in response to the determination that the hand is not raised towards the display to point at the display, and the interpretation component to analyze the at least one image to determine a direction in which a digit of the hand is pointing to select the selectable item in response to the determination that the hand is raised towards the display to point at the display.

Example 16 includes the subject matter of any of Examples 13-15, and includes an attention component communicatively coupled to the interpretation component to condition determination of the direction on a determination of whether the gaze of the operator is directed towards the display.

Example 17 includes the subject matter of any of Examples 13-16, in which the user interface component is to visually present the selectable item in a larger size in the second view than in the first view.

Example 18 includes the subject matter of any of Examples 13-17, in which the user interface component to visually present the selectable item in the second view within a pointing menu comprising the selectable item and to position the center of the pointing menu at a location on the display; and the interpretation component to analyze the at least one image to determine the location on the display at which a digit of the hand is pointed and to detect a twitch movement of the digit towards the selectable item.

Example 19 includes the subject matter of any of Examples 13-18, and includes a proximity sensor to detect a distance of the operator, and a position component communicatively coupled to the proximity sensor and to the interpretation component to condition the determination of whether the hand is raised towards the display to point at the display on a determination of the distance of the operator from a manually-operable control and to provide the determination of the distance to the user interface component.

Example 20 includes the subject matter of any of Examples 13-19, in which the position component communicatively coupled to the user interface component to enable the user interface component to dynamically select and visually present a third view of the visual portion of the user interface in response to a determination that the operator is not proximate to the control, the selected item visually presented in the third view in a size larger than the size of the selected item in either of the first and second views.

Example 21 includes the subject matter of any of Examples 13-20, and includes an identification component communicatively coupled to the image sensor and to the user interface component to determine a measurement of a hand of the operator from the at least one image and compare the measurement to biometric data of the hand of the operator to verify the operator, the user interface component to visually present a login prompt to the operator.

Example 22 includes the subject matter of any of Examples 13-21, in which the identification component is to analyze a hand gesture of the operator in the at least one image to verify the operator.

Example 23 is a computer-implemented method for managing a user interface that includes capturing at least one image of an operator, determining a proximate distance of the operator from a manually-operable control, and providing the determination of the distance to logic to enable dynamic selection of one of multiple views of a visual portion of a user interface.

Example 24 includes the subject matter of Example 23, and includes, in response to determining that the operator is proximate to the control, analyzing the at least one image to determine whether a hand of the operator is raised towards a display, visually presenting a first view of a visual portion of a user interface in response to determining that the hand is not raised towards the display, and visually presenting a second view of the visual portion of the user interface in response to determining that the hand is raised towards the display to point at the display, as well as visually presenting a third view of the visual portion of the user interface in response to determining that the operator is not proximate to the control.

Example 25 includes the subject matter of any of Examples 23-24, and includes receiving signals indicative of operation of the control to select the selectable item in response to determining that the operator is proximate to the control and that the hand is not raised towards the display, analyzing the at least one image to determine a direction in which a digit of the hand is pointing to select the selectable item in response to determining that the hand is raised towards the display to point at the display and that the operator is proximate to the control, and analyzing the at least one image to interpret a hand gesture of the operator to select the selectable item in response to the determination that the operator is not proximate to the control.

Example 26 includes the subject matter of any of Examples 23-25, and includes conditioning interpreting the hand gesture on a determination of whether the gaze of the operator is directed towards the display.

Example 27 includes the subject matter of any of Examples 23-26, and includes conditioning determining the direction on a determination of whether the gaze of the operator is directed towards the display.

Example 28 includes the subject matter of any of Examples 23-27, and includes analyzing the at least one image to determine the distance of the operator from the manually-operable control.

Example 29 includes the subject matter of any of Examples 23-28, and includes ignoring all hand gestures of the operator in response to a determination that the distance is greater than a selected distance, the selected distance great enough to preclude access by the operator to the control.

Example 30 is at least one machine-readable storage medium comprising instructions that when executed by a computing device, cause the computing device to capture at least one image of an operator of the computing device, determine a proximate distance of the operator from a manually-operable control, and provide the determination of the distance to logic to enable dynamic selection of one of multiple views of a visual portion of a user interface.

Example 31 includes the subject matter of Example 30, in which the computing device is caused to, in response to determining that the distance is short enough to enable the operator to operate the control, analyze the at least one image to determine whether a hand of the operator is raised towards a display, visually present a first view of a visual portion of a user interface in response to determining that the hand is not raised towards the display, and visually present a second view of the visual portion of the user interface in response to determining that the hand is raised towards the display to point at the display, as well as to visually present a third view of the visual portion of the user interface in response to determining that the operator is not proximate to the control.

Example 32 includes the subject matter of any of Examples 30-31, in which the computing device caused to receive signals indicative of operation of the control to select the selectable item in response to determining that the operator is proximate to the control and that the hand is not raised towards the display, analyze the at least one image to determine a direction in which a digit of the hand is pointing to select the selectable item in response to determining that the hand is raised towards the display to point at the display and that the operator is proximate to the control, and analyze the at least one image to interpret a hand gesture of the operator to select the selectable item in response to the determination that the operator is not proximate to the control.

Example 33 includes the subject matter of any of Examples 30-32, in which the computing device caused to condition interpreting the hand gesture on a determination of whether the gaze of the operator is directed towards the display.

Example 34 includes the subject matter of any of Examples 30-33, in which the computing device caused to condition determining the direction on a determination of whether the gaze of the operator is directed towards the display.

Example 35 includes the subject matter of any of Examples 30-34, in which the computing device caused to analyze the at least one image to determine the distance of the operator from the manually-operable control.

Example 36 includes the subject matter of any of Examples 30-35, in which the computing device is caused to visually present a login prompt to the operator, determine a measurement of a hand of the operator from the at least one image, and compare the measurement to biometric data of the hand of the operator to verify the operator.

Example 37 includes the subject matter of any of Examples 30-36, in which the computing device caused to analyze a hand gesture of the operator in the at least one image to verify the operator.

Example 38 is an apparatus to manage a user interface that includes means for capturing at least one image of an operator, determining a proximate distance of the operator from a manually-operable control, and providing the determination of the distance to the logic to enable dynamic selection of one of multiple views of a visual portion of a user interface.

Example 39 includes the subject matter of Example 38, and includes means for, in response to determining that the distance is short enough to enable the operator to operate the control, analyzing the at least one image to determine whether a hand of the operator is raised towards a display, visually presenting a first view of a visual portion of a user interface in response to determining that the hand is not raised towards the display, and visually presenting a second view of the visual portion of the user interface in response to determining that the hand is raised towards the display to point at the display, as well as visually presenting a third view of the visual portion of the user interface in response to determining that the operator is not proximate to the control.

Example 40 includes the subject matter of any of Examples 38-39, and includes means for receiving signals indicative of operation of the control to select the selectable item in response to determining that the operator is proximate to the control and that the hand is not raised towards the display, analyzing the at least one image to determine a direction in which a digit of the hand is pointing to select the selectable item in response to determining that the hand is raised towards the display to point at the display and that the operator is proximate to the control, and analyzing the at least one image to interpret a hand gesture of the operator to select the selectable item in response to the determination that the operator is not proximate to the control.

Example 41 includes the subject matter of any of Examples 38-40, and includes means for conditioning interpreting the hand gesture on a determination of whether the gaze of the operator is directed towards the display.

Example 42 includes the subject matter of any of Examples 38-41, and includes means for conditioning determining the direction on a determination of whether the gaze of the operator is directed towards the display.

Example 43 includes the subject matter of any of Examples 38-42, and includes means for analyzing the at least one image to determine the distance of the operator from the manually-operable control.

Example 44 includes the subject matter of any of Examples 38-43, and includes means for visually presenting a login prompt to the operator, determining a measurement of a hand of the operator from the at least one image, and comparing the measurement to biometric data of the hand of the operator to verify the operator.

Example 45 includes the subject matter of any of Examples 38-44, and includes means for analyzing a hand gesture of the operator in the at least one image to verify the operator.

Example 46 is an apparatus to manage a user interface that includes a display; and a user interface component communicatively coupled to the display to receive an indication of a proximate distance of an operator from a manually-operable control, dynamically select and visually present a first view of the visual portion of a user interface comprising a selectable on the display item in response to a determination that the operator is proximate to the control, and dynamically select and visually present a second view of the visual portion of the user interface on the display in response to a determination that the operator is not proximate to the control, the selectable item visually presented in a larger size in the second view than in the first view.

Example 47 includes the subject matter of Example 46, in which the user interface component is communicatively coupled to the control to receive signals indicative of operation of the control to select the selectable item in response to the determination that the operator is proximate to the control.

Example 48 includes the subject matter of any of Examples 46-47, in which the user interface component is to dynamically select and visually present a third view of the visual portion of the user interface on the display in response to a determination that the distance is greater than a selected distance, the selected distance great enough to preclude access by the operator to the control, and the selected item visually presented in the third view in a size larger than the size of the selected item in either of the first and second views.

Example 49 includes the subject matter of any of Examples 46-48, and includes an image sensor to capture at least one image of the operator, and a position component communicatively coupled to the image sensor and to the user interface component to determine a proximate distance of the operator to a manually-operable control and to provide the determination of the distance to the user interface component to enable dynamic selection of one of multiple views of a visual portion of the user interface.

Example 50 includes the subject matter of any of Examples 46-49, and includes an identification component communicatively coupled to the image sensor and to the user interface component to determine a measurement of a hand of the operator from the at least one image and to compare the measurement to biometric data of the hand of the operator to verify the operator, the user interface component to visually present a login prompt to the operator.

Example 51 includes the subject matter of any of Examples 46-50, and includes an interpretation component communicatively coupled to the image sensor and the position component, the interpretation component to analyze the at least one image to interpret a hand gesture of the operator to select the selectable item in response to the determination that the operator is not proximate to the control.

Example 52 includes the subject matter of any of Examples 46-51, and includes an eye tracker to track a direction of gaze of the operator, and an attention component communicatively coupled to the eye tracker and the interpretation component to condition interpretation of the hand gesture on a determination of whether the gaze of the operator is directed towards a display.

Example 53 includes the subject matter of any of Examples 46-52, in which the interpretation component is to ignore all hand gestures of the operator in response to a determination that the distance is greater than a selected distance, the selected distance great enough to preclude access by the operator to the control.

Example 54 includes the subject matter of any of Examples 46-53, and includes an identification component communicatively coupled to the image sensor and to the user interface component to determine a measurement of a hand of the operator from the at least one image and to compare the measurement to biometric data of the hand of the operator to verify the operator, the user interface component to visually present a login prompt to the operator.

Example 55 includes the subject matter of any of Examples 46-54, in which the identification component is to analyze a hand gesture of the operator in the at least one image to verify the operator.

Example 56 includes the subject matter of any of Examples 46-55, and includes a proximity sensor, the position component communicatively coupled to proximity sensor to determine the distance of the operator from the manually-operable control from a signal indicative of the distance received from the proximity sensor.

Example 57 includes the subject matter of any of Examples 46-56, in which the position component to analyze the at least one image to determine the distance of the operator from the manually-operable control.

Example 58 is an apparatus to manage a user interface that includes means for performing the method of any of Examples 23-29.

The invention claimed is:

1. An apparatus to manage a user interface on a display comprising:
   a processor;
   an image sensor to capture at least one image of an operator;
   a position component, at least a portion of which is implemented in hardware, to determine a proximate distance of the operator to a manually-operable control based on the at least one captured image, wherein the manually-operable control is separate from the display;
   an interpretation component, at least a portion of which is implemented in hardware, to analyze the at least one captured image to determine whether a hand of the operator is raised and pointed towards the display; and
   a user interface component, at least a portion of which is implemented in hardware, to visually present one of a plurality of views of a visual portion of the user interface comprising at least one selectable item, the user interface component to:
      present, in response to a first determination that the hand of the operator is within a specified distance to the manually-operable control and the hand of the operator is not raised and pointed towards the display, a first view of the visual portion of the user interface;
      present, in the first view, the at least one selectable item on a first menu, wherein the at least one selectable item presented in a first size and a first location on the first menu;
      present, in response to a second determination that the hand of the operator is within the specified distance to the manually-operable control and the hand of the operator is raised and pointed towards the display, a second view of the visual portion of the user interface;
      present concurrently, in the second view, the first menu and a circular pointing menu, wherein the circular pointing menu is separate from the first menu and the circular pointing menu is displayed at a second location indicated by a digit of the operator;
      present, within the circular pointing menu, the at least one selectable item in a third location that is different than the first location and having a second size that is larger than the first size;
      present, in response to a third determination that the hand of the operator is not within the specified distance to the manually-operable control, a third view of the visual portion of the user interface; and
      present, in the third view, the at least one selectable item on the first menu in the first location and having a third size that is larger than the second size.

2. The apparatus of claim 1, comprising:
   the user interface component communicatively coupled to the manually-operable control to receive signals indicative of operation of the manually-operable control to select the at least one selectable item in response to the first determination; and
   the interpretation component to analyze the at least one captured image to determine a direction in which the digit of the hand of the operator is pointing to select the at least one selectable item in response to the second determination.

3. The apparatus of claim 2, comprising:
   an eye tracker to track a direction of a gaze of the operator;
   an attention component, at least a portion of which is implemented in hardware, to condition determination of the direction in which the digit of the hand of the operator is pointed to select the at least one selectable item based on whether the eye tracker tracks the gaze of the operator in a direction towards the display.

4. The apparatus of claim 2, comprising:
   the user interface component to visually present the at least one selectable item in the second view within the circular pointing menu and position a center of the circular pointing menu at a location on the display; and
   the interpretation component to analyze the at least one captured image to determine a location on the display at which the digit of the hand of the operator is pointed and to detect a twitch movement of the digit of the hand of the operator towards the at least one selectable item.

5. The apparatus of claim 1, comprising:
   an identification component, at least a portion of which is implemented in hardware, to determine a measurement of the hand of the operator based on the at least one captured image and compare the measurement to biometric data of the hand of the operator to verify the operator; and
   the user interface component to visually present a login prompt to the operator.

6. A computer-implemented method for managing a user interface on a display comprising:
   capturing at least one image of an operator using an image sensor;
   determining, at a processor element, a proximate distance of the operator from a manually-operable control based on the at least one captured image, wherein the manually-operable control is separate from the display; and
   enabling a dynamic selection of one of a plurality of views of a visual portion of the user interface based on the determined proximate distance, the dynamic selection including:

analyzing the at least one captured image to determine whether a hand of the operator is raised and pointed towards the display, the user interface comprising at least one selectable item;

visually presenting, in response to a first determination that the hand of the operator is within a specified distance to the manually-operable control and the hand of the operator is not raised and pointed towards the display, a first view of the visual portion of the user interface;

presenting, in the first view, the at least one selectable item on a first menu, wherein the at least one selectable item presented in a first size and a first location on the first menu;

visually presenting, in response to a second determination that the hand of the operator is within the specified distance to operate the manually-operable control and the hand of the operator is raised and pointed towards the display, a second view of the visual portion of the user interface;

presenting concurrently, in the second view, the first menu and a circular pointing menu, wherein the circular pointing menu is separate from the first menu and the circular pointing menu is displayed at a second location indicated by a digit of the operator;

presenting, within the circular pointing menu, the at least one selectable item in a third location that is different than the first location and having a second size that is larger than the first size;

visually presenting, in response to a third determination that the hand of the operator is not within the specified distance to the manually-operable control, a third view of the visual portion of the user interface; and presenting, in the third view, the at least one selectable item on the first menu in the first location and having a third size that is larger than the second size.

7. The computer-implemented method of claim 6 comprising:

receiving signals indicative of operation of the manually-operable control to select the at least one selectable item in response to determining that the operator is within the specified distance to the manually-operable control and that the hand of the operator is not raised and pointed towards the display;

analyzing the at least one captured image to determine a direction in which the digit of the hand of the operator is pointing to select the at least one selectable item in response to determining that the hand of the operator is raised and pointed towards the display and that the operator is within the specified distance to the manually-operable control; and analyzing the at least one captured image to interpret a hand gesture of the operator to select the at least one selectable item in response to determining that the operator is not within the specified distance to the manually-operable control.

8. The computer-implemented method of claim 7, comprising:

track a direction of a gaze of the operator; and conditioning interpreting the hand gesture based on a determination of whether the gaze of the operator is directed towards the display.

9. The computer-implemented method of claim 6, comprising analyzing the at least one captured image to determine a distance of the operator from the manually-operable control.

10. The computer-implemented method of claim 9, comprising ignoring all hand gestures of the operator in response to a determination that the distance is greater than a selected distance, the selected distance great enough to preclude access by the operator to the manually-operable control.

11. At least one non-transitory machine-readable storage medium comprising instructions that when executed by a computing device, cause the computing device to:

capture, using an image sensor, at least one image of an operator for a user interface on a display;

determine a proximate distance of the operator from a manually-operable control based on the at least one captured image, wherein the manually-operable control is separate from the display; and enable a dynamic selection of one of multiple views of a visual portion of the user interface based on the determined proximate distance, the dynamic selection to include the computing device to:

analyze the at least one captured image to determine whether a hand of the operator is raised and pointed towards the display, the user interface comprising at least one selectable item;

visually present, in response to a first determination that the hand of the operator is within a specified distance to the manually-operable control and the hand of the operator is not raised and pointed towards the display, a first view of the visual portion of the user interface;

present, in the first view, the at least one selectable item on a first menu, wherein the at least one selectable item presented in a first size and a first location on the first menu;

visually present, in response to a second determination that the hand of the operator is within the specified distance to the manually-operable control and the hand of the operator is raised and pointed towards the display, a second view of the visual portion of the user interface;

present concurrently, in the second view, the first menu and a circular pointing menu, wherein the circular pointing menu is separate from the first menu and the circular pointing menu is displayed at a second location indicated by a digit of the operator;

present, within the circular pointing menu, the at least one selectable item in a third location that is different than the first location and having a second size that is larger than the first size;

visually present, in response to a third determination that the hand of the operator is not within the specified distance to the manually-operable control, a third view of the visual portion of the user interface; and present, in the third view, the at least one selectable item on the first menu in the first location and having a third size that is larger than the second size.

12. The at least one non-transitory machine-readable storage medium of claim 11, the computing device caused to:

receive signals indicative of operation of the manually-operable control to select the at least one selectable item in response to a determination that the operator is within the specified distance to the manually-operable control and that the hand of the operator is not raised and pointed towards the display;

analyze the at least one captured image to determine a direction in which a digit of the hand of the operator is pointing to select the at least one selectable item in response to a determination that the hand of the operator is raised and pointed towards the display and that the operator is within the specified distance to the manually-operable control; and analyze the at least one captured image to interpret a hand gesture of the operator to select the at least one selectable item in response to a determination that the operator is not within the specified distance to the manually-operable control.

13. The at least one non-transitory machine-readable storage medium of claim 12, comprising the computing device caused to:

track a direction of a gaze of the operator; and condition interpreting the hand gesture based on a determination of whether the gaze of the operator is directed towards the display.

14. The at least one non-transitory machine-readable storage medium of claim 11, the computing device caused to:

visually present a login prompt to the operator;

determine a measurement of the hand of the operator based on the at least one captured image; and compare the measurement to biometric data of the hand of the operator to verify the operator.

15. The at least one non-transitory machine-readable storage medium of claim 14, the computing device caused to analyze a hand gesture of the operator in the at least one captured image to verify the operator.

16. The apparatus of claim 5, comprising:

the identification component to analyze a hand gesture of the operator in the at least one captured image to further verify the operator.

* * * * *